United States Patent
Tanaka et al.

(10) Patent No.: US 11,845,861 B2
(45) Date of Patent: Dec. 19, 2023

(54) RESIN COMPOSITION AND MOLDED ARTICLE THEREOF

(71) Applicant: Eastman Chemical Company, Kingsport, TN (US)

(72) Inventors: Ryo Tanaka, Minamiashigara (JP); Kana Miyazaki, Minamiashigara (JP); Masahiro Moriyama, Minamiashigara (JP); Kenji Yao, Minamiashigara (JP)

(73) Assignee: Eastman Chemical Company, Kingsport, TN (US)

( * ) Notice: Subject to any disclaimer, the term of this patent is extended or adjusted under 35 U.S.C. 154(b) by 495 days.

(21) Appl. No.: 16/977,611

(22) PCT Filed: Jul. 27, 2018

(86) PCT No.: PCT/JP2018/028355
§ 371 (c)(1),
(2) Date: Sep. 2, 2020

(87) PCT Pub. No.: WO2019/171613
PCT Pub. Date: Sep. 12, 2019

(65) Prior Publication Data
US 2021/0040311 A1      Feb. 11, 2021

(30) Foreign Application Priority Data
Mar. 6, 2018   (JP) .................................. 2018-039561

(51) Int. Cl.
| C08L 67/04 | (2006.01) |
| C08L 1/12 | (2006.01) |
| C08L 33/04 | (2006.01) |
| C08L 1/10 | (2006.01) |
| C08L 1/14 | (2006.01) |

(52) U.S. Cl.
CPC ................. *C08L 67/04* (2013.01); *C08L 1/10* (2013.01); *C08L 1/12* (2013.01); *C08L 1/14* (2013.01); *C08L 33/04* (2013.01)

(58) Field of Classification Search
CPC .. C08L 67/04; C08L 33/04; C08L 1/12; C08L 1/10; C08L 1/14
See application file for complete search history.

(56) References Cited

U.S. PATENT DOCUMENTS

| 5,583,214 A | * | 12/1996 | Partain, III | .......... | C09D 201/00 536/87 |
| 2013/0331518 A1 | | 12/2013 | Immonen et al. | | |
| 2015/0368442 A1 | * | 12/2015 | Soyama | .................... | C08L 1/08 524/41 |

FOREIGN PATENT DOCUMENTS

| JP | 2003-221464 A | 8/2003 |
| JP | 2009-527597 A | 7/2009 |
| JP | 2012-219112 A | 11/2012 |
| JP | 2016-069423 A | 5/2016 |
| JP | 6323605 B1 | 5/2018 |
| JP | 6323970 B1 | 5/2018 |
| JP | 2018-127579 A | 8/2018 |
| WO | WO 2011/043279 A1 | 4/2011 |
| WO | WO 2012/017769 A1 | 2/2012 |
| WO | WO 2012/117165 A1 | 9/2012 |
| WO | WO 2014/119657 A1 | 8/2014 |

OTHER PUBLICATIONS

Notification of Transmittal of the International Search Report and the Written Opinion of the International Searching Authority dated Oct. 23, 2018 for International Application No. PCT/JP2018/028354.
Notification of Transmittal of the International Search Report and the Written Opinion of the International Searching Authority dated Oct. 23, 2018 for International Application No. PCT/JP2018/028355.
Co-pending U.S. Appl. No. 16/977,621, filed Sep. 2, 2020, Tanaka et al. (Now U.S. Publication No. 2021/0040311).

\* cited by examiner

*Primary Examiner* — Patrick D Niland
(74) *Attorney, Agent, or Firm* — Robert C. Morriss

(57) ABSTRACT

A resin composition, including a cellulose acylate (A), a polyester resin (B), and a cardanol composition (C) containing a cardanol-based compound having an epoxy group.

19 Claims, No Drawings

RESIN COMPOSITION AND MOLDED ARTICLE THEREOF

CROSS-REFERENCE TO RELATED APPLICATION(S)

This application is a national stage filing under 35 USC § 371 of International Application Number PCT/JP2018/028355, filed on, Jul. 27, 2018 which claims priority to Japanese Application JP 2018-039561, filed on Mar. 6, 2018, the entire disclosures of which are incorporated by reference herein.

TECHNICAL FIELD

The present invention relates to a resin composition and a resin-molded body.

BACKGROUND ART

Conventionally, a variety of substances are provided as resin compositions, and these are used for various purposes. Resin compositions are used for various components, housings, and the like in items such as home appliances and automobiles in particular. Furthermore, thermoplastic resins are also used in components for items such as housings for office equipment and electronic and electrical equipment.

Plant-based resins have been utilized in recent years, and cellulose acylate is one of the plant-based resins that are conventionally known.

For example, "a resin composition containing a cellulose ester resin, a compound including an adipate, and a polyhydroxyalkanoate resin" is disclosed in Patent Literature 1.

PRIOR ART LITERATURE

Patent Literature

Patent Literature 1: Japanese Unexamined Patent Application Publication No. 2016-069423

SUMMARY OF INVENTION

Problem to be Solved by Invention

Incidentally, cellulose acylate (A) is characterized by high transparency. However, in a resin material containing a polyester compound (B) in cellulose acylate (A), transparency is sometimes inferior, even though that is one of the characteristics of cellulose acylate (A).

Thus, a problem of the present invention is to provide a resin composition having high transparency compared to when including a cardanol composition containing only a cardanol-based compound having no epoxy group as the cardanol composition in a resin composition including the cellulose acylate (A) and the polyester resin (B).

Means for Solving Problem

The problem is solved by the following means.

<1>
A first aspect of the present invention is a resin composition, including:
a cellulose acylate (A),
a polyester resin (B), and
a cardanol composition (C) containing a cardanol-based compound having an epoxy group.

<2>
Another aspect of the present invention is the resin composition according to <1>, further including a polymer (D) of at least one type selected from a polymer with a core-shell structure having a core layer and a shell layer including a polymer of alkyl (meth)acrylate on the surface of the core layer, and an olefin polymer including 60% by mass or more of a structural unit derived from an α-olefin.

<3>
In the resin composition according to <1> or <2>, a poly(meth)acrylate compound (E) including 50 parts by mass or more of a structural unit derived from an alkyl (meth)acrylate may be further included.

<4>
In the resin composition according to any of <1> to <3>, the cellulose acylate (A) may be at least one type selected from cellulose acetate propionate (CAP) and cellulose acetate butyrate (CAB).

<5>
In the resin composition according to any of <1> to <4>, the polyester resin (B) may be a polyhydroxyalkanoate.

<6>
In the resin composition according to <5>, the polyester resin (B) may be a polylactic acid.

<7>
In the resin composition according to any of <1> to <6>, the cardanol composition (C) may further include a compound of at least one type selected from a compound represented by a general formula (CDN1), and a polymer in which the compound represented by the general formula (CDN1) is polymerized.

[Formula 1]

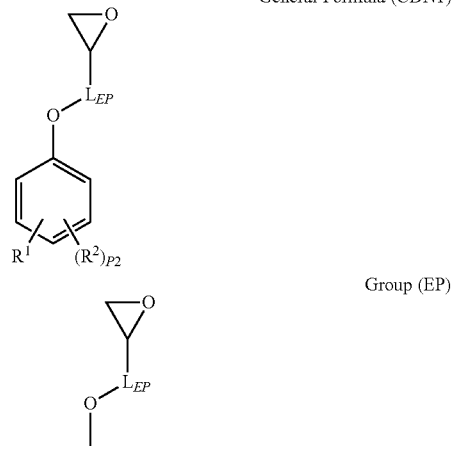

(In general formula (CDN1), $R^1$ represents an alkyl group that may have a substituent group, or an unsaturated aliphatic group that has a double bond and may have a substituent group. $R^2$ represents a group represented by the group (EP), a hydroxyl group, a carboxy group, an alkyl group that may have a substituent group, or an unsaturated aliphatic group that has a double bond and may have a substituent group. P2 represents an integer of 0 or more and 4 or less. Note that each $R^2$, which is present in plurality when P2 is two or more, may be the same group, or may be a different group.

In general formula (CDN1) and group (EP), $L_{EP}$ represents a single bond or a divalent linking group. Note that each $L_{EP}$, which is present in plurality in general formula (CDN1) when there is a group represented by the group (EP) as $R^2$, may be the same group, or may be a different group.)
<8>
In the resin composition according to any of <1> to <7>, the epoxy equivalent of the cardanol composition (C) may be 500 or less.
<9>
In the resin composition according to any of <1> to <8>, the mass ratio (B/A) of the polyester resin (B) to the cellulose acylate (A) may be 0.05 or more and 0.5 or less.
<10>
In the resin composition according to any of <1> to <9>, the mass ratio (C/A) of the cardanol composition (C) to the cellulose acylate (A) may be 0.01 or more and 0.3 or less.
<11>
In the resin composition according to any of <1> to <10>, the mass ratio (C/B) of the cardanol composition (C) to the polyester resin (B) may be 0.15 or more and 3.75 or less.
<12>
In the resin composition according to <10> or <11>, the mass ratio (C/(A+B+C)) of the cardanol composition (C) to the total of the cellulose acylate (A), the polyester resin (B), and the cardanol composition (C) may be 0.015 or more and 0.245 or less.
<13>
Another aspect of the present invention is a resin-molded body, including the resin composition according to any of <1> to <12>.
<14>
The resin-molded body according to <13> may be an injection-molded body.

Effect of Invention

According to aspects <1>, <2>, <3>, <6>, or <7>, a resin composition is provided having high transparency compared to when including a cardanol composition containing only a cardanol-based compound having no epoxy group as the cardanol composition in a resin composition including a cellulose acylate (A) and a polyester resin (B).

According to aspect <4>, the resin composition is provided having high transparency compared to when the cellulose acylate (A) is cellulose diacetate (DAC).

According to aspect <5>, the resin composition is provided having high transparency compared to when the polyester resin (B) is polyethylene terephthalate.

According to aspect <8>, the resin composition is provided having high transparency compared to when the epoxy equivalent of the cardanol composition (C) is more than 500.

According to aspect <9>, the resin composition is provided having a high modulus of elasticity compared to when the mass ratio (B/A) of the polyester resin (B) to the cellulose acylate (A) is less than 0.05, and the resin composition is provided having high impact strength compared to when the mass ratio (B/A) is more than 0.5.

According to aspect <10>, the resin composition is provided having high transparency compared to when the mass ratio (C/A) of the cardanol composition (C) to the cellulose acylate (A) is less than 0.01 or more than 0.3.

According to aspect <11>, the resin composition is provided having high transparency compared to when the mass ratio (C/B) of the cardanol composition (C) to the polyester resin (B) is less than 0.15 or more than 3.75.

According to aspect <12>, the resin composition is provided having high transparency compared to when the mass ratio (C/(A+B+C)) of the cardanol composition (C) to the total of the cellulose acylate (A), the polyester resin (B), and the cardanol composition (C) is less than 0.015 or more than 0.245.

According to aspect <13>, a resin-molded body is provided having high transparency compared to when applying a resin composition including the cellulose acylate (A) and the polyester resin (B), and also including a cardanol composition containing only a cardanol-based compound having no epoxy group as the cardanol composition.

According to aspect <14>, an injection-molded body is provided having high transparency compared to when applying a resin composition including the cellulose acylate (A) and the polyester resin (B), and also including a cardanol composition containing only a cardanol-based compound having no epoxy group as the cardanol composition.

EMBODIMENTS OF INVENTION

An embodiment which is an example of the present invention will be described below.

Note that in the present specification, when there is a plurality of types of substances corresponding to each component present in an object, the amount of each component in the object means the total content rate or content of the plurality of types of substances present in the object, unless otherwise noted.

Furthermore, the notation "polymer of A" is an expression including not only a homopolymer of only A, but also a copolymer of A and a monomer other than A. Similarly, the notation "copolymer of A and B" is an expression including not only a copolymer of only A and B (hereinafter also referred to as a "homocopolymer" as appropriate), but also a copolymer of A and B and a monomer other than A and B.

Furthermore, cellulose acylate (A), polyester resin (B), cardanol composition (C), polymer (D), and poly(meth)acrylate compound (E) are also referred to, respectively, as component (A), component (B), component (C), component (D), and component (E).

<Resin Composition>

A resin composition of the present embodiment includes a cellulose acylate (A), a polyester resin (B), and a cardanol composition (C) containing a cardanol-based compound having an epoxy group.

The resin composition of the present embodiment may also include other components, such as a polymer (D), a poly(meth)acrylate compound (E), or the like.

Here, conventionally, the cellulose acylate (A) (specifically, a cellulose acylate having one portion of a hydroxyl group substituted with an acyl group) is composed of a non-edible resource, and since this is a primary derivative that does not require chemical polymerization, it is an environmentally friendly resin material. Furthermore, due to its strong hydrogen bonding property, it has a high modulus of elasticity as a resin material. Moreover, it is characterized by high transparency.

However, in a resin material containing a polyester compound (B) in cellulose acylate (A), transparency is sometimes inferior, even though transparency is one of the characteristics of cellulose acylate (A). This is because in a resin composition including both component (A) and component (B), a sea-island structure is formed in which the polyester resin (B) is dispersed in an island shape in a sea of cellulose acylate (A), and moreover, the refractive indices of both usually form a relation of component (A)>component (B); thus, transparency is considered to drop due to the difference in the refractive indices of the sea-island parts.

In contrast to this, high transparency of the resin composition of the present embodiment is obtained by including the cellulose acylate (A), the polyester resin (B), and the cardanol composition (C) containing a cardanol-based compound having an epoxy group.

The reason thereof is presumed to be as follows.

The cardanol-based compound has high affinity for both the cellulose acylate (A) and the polyester compound (B), and also exhibits high dispersibility for both. However, when this cardanol-based compound has an epoxy group in particular, its affinity for component (B) becomes much higher, and it is comparatively likely to localize at the component (B) side. In other words, when the cardanol composition (C) containing the cardanol-based compound having an epoxy group is added to a resin system including component (A) and component (B), the ratio of component (C) that is present is higher in proportion in component (B) than in proportion in component (A). Also, since the refractive index of component (C) is usually greater than component (B), the difference in the refractive indices between the sea-island parts becomes smaller compared to when component (C) is not contained, and as a result, transparency improves.

From the above, it is presumed that high transparency is obtained for the resin composition of the present embodiment.

Furthermore, in the present embodiment, a resin composition having suppressed water absorption is obtained by including component (C); in other words, a resin composition having excellent water resistance is obtained.

Hereinafter, the components of the resin composition of the present embodiment will be described in detail.

[Cellulose Acylate (A): Component (A)]

The cellulose acylate (A) is, for example, a resin of a cellulose derivative in which at least one portion of the hydroxyl group in cellulose is substituted with an acyl group (acylated). Specifically, the cellulose acylate (A) is, for example, a cellulose derivative represented by general formula (CE).

[Formula 2]

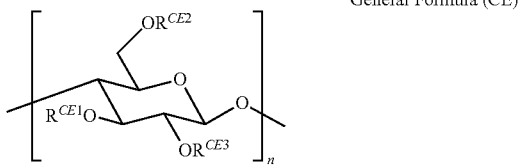

General Formula (CE)

In general formula (CE), $R^{CE1}$, $R^{CE2}$, and $R^{CE3}$ each independently represent a hydrogen atom, or an acyl group. n represents an integer of 2 or more. However, at least one portion from among $R^{CE1}$ of n, $R^{CE2}$ of n, and $R^{CE3}$ of n represents an acyl group.

Note that the acyl group represented by $R^{CE1}$, $R^{CE2}$, and $R^{CE3}$ is preferably an acyl group having 1 or more and 6 or less carbon atoms.

In general formula (CE), although the scope of n is not particularly limited, 200 or more and 1,000 or less is preferable, and 500 or more and 1,000 or less is more preferable.

In general formula (CE), the fact that $R^{CE1}$, $R^{CE2}$, and $R^{CE3}$ each independently represent an acyl group shows that at least one portion of the hydroxyl group in the cellulose derivative represented by general formula (CE) is acylated.

In other words, $R^{CE1}$, which is n in a molecule of the cellulose derivative represented by general formula (CE), may be all the same, partly the same, or mutually different.

Similarly, $R^{CE2}$, which is n, and $R^{CE3}$, which is n, may also each be all the same, partly the same, or mutually different.

Here, the cellulose acylate (A) preferably has an acyl group having 1 or more and 6 or less carbon atoms as the acyl group. Compared to when having an acyl group having 7 or more carbon atoms, it becomes likely to be able to obtain a resin-molded body having excellent impact resistance while suppressing a decrease in transparency.

The acyl group is represented by a structure "—CO—$R^{Ac}$," and $R^{Ac}$ represents a hydrogen atom, or a hydrocarbon group (more preferably a hydrocarbon group having 1 or more and 5 or less carbon atoms).

The hydrocarbon group represented by $R^{AC}$ may be any of a linear shape, branched shape, and cyclic shape, but a linear shape is more preferable.

The hydrocarbon group represented by $R^{AC}$ may be either a saturated hydrocarbon group or an unsaturated hydrocarbon group, but a saturated hydrocarbon group is more preferable.

The hydrocarbon group represented by $R^{AC}$ may have another atom other than carbon and hydrogen (for example, oxygen, nitrogen, or the like), but a hydrocarbon group composed of only carbon and hydrogen is more preferable.

Examples of the acyl group include a formyl group, an acetyl group, a propionyl group, a butyryl group (butanoyl group), a propenoyl group, a hexanoyl group, or the like.

Even among these, from the viewpoint of an improvement to moldability of the resin composition and also an improvement to transparency, an acyl group having 2 or more and 4 or less carbon atoms is more preferable as the acyl group, and an acyl group having 2 or more and 3 or less carbon atoms is even more preferable.

Examples of the cellulose acylate (A) include cellulose acetate (cellulose monoacetate, cellulose diacetate (DAC), and cellulose triacetate), cellulose acetate propionate (CAP), cellulose acetate butyrate (CAB), or the like.

The cellulose acylate (A) may be used alone or in a combination of two or more types.

Even among these, from the viewpoint of an improvement to the transparency of the resin composition, cellulose acetate propionate (CAP) and cellulose acetate butyrate (CAB) are preferable as the cellulose acylate (A), and cellulose acetate propionate (CAP) is more preferable.

From the viewpoint of an improvement to moldability of the resin composition and an improvement to tensile elongation at break of the resin-molded body, the weight-average degree of polymerization of the cellulose acylate (A) is preferably 200 or more and 1,000 or less, and more preferably 500 or more and 1,000 or less.

Here, the weight-average degree of polymerization is found in the following procedure from the weight-average molecular weight (Mw).

First, the weight-average molecular weight (Mw) of the cellulose acylate (A) is measured using tetrahydrofuran through conversion of polystyrene using a gel permeation chromatography device (GPC device: manufactured by Tosoh Corporation, HLC-8320GPC, column: TSKgelα-M).

Next, the degree of polymerization of the cellulose acylate (A) is found by dividing by the molecular weight of the constitutional units of the cellulose acylate (A). Note that when, for example, the substituent group of the cellulose acylate is an acetyl group, the molecular weight of the constitutional units is 263 when the degree of substitution is 2.4, and 284 when the degree of substitution is 2.9.

From the viewpoint of an improvement to moldability of the resin composition and an improvement to transparency, the degree of substitution of the cellulose acylate (A) is preferably 2.1 or more and 2.85 or less, the degree of substitution is more preferably 2.2 or more and 2.85 or less, even more preferably 2.3 or more and 2.5 or less, and particularly preferably 2.35 or more and 2.8 or less.

Note that from the viewpoint of an improvement to moldability of the resin composition and an improvement to transparency, in cellulose acetate propionate (CAP), the ratio of the degree of substitution between the acetyl group and the propionyl group (acetyl group/propionyl group) is preferably 5/1 or more and 1/20 or less, and more preferably 3/1 or more and 1/15 or less.

From the viewpoint of an improvement to moldability of the resin composition and an improvement to transparency, in cellulose acetate butyrate (CAB), the ratio of the degree of substitution between the acetyl group and the butyryl group (acetyl group/butyryl group) is preferably 5/1 or more and 1/20 or less, and more preferably 4/1 or more and 1/15 or less.

Here, the degree of substitution is an indicator for indicating the degree to which a hydroxyl group of cellulose is substituted with an acyl group. In other words, the degree of substitution serves as an indicator for indicating the degree of acylation of the cellulose acylate (A). Specifically, degree of substitution means an intramolecular average number of substitutions in which three hydroxyl groups in D-glucopyranose units of cellulose acylate are substituted with an acyl group.

Also, the degree of substitution is measured from the integral ratio of cellulose-derived hydrogen and acyl group-derived peaks using $H^1$-NMR (manufactured by JMN-ECA/ JEOL RESONANCE Co., Ltd.).

[Polyester Resin (B): Component (B)]

The polyester resin (B) is, for example, a polymer of a hydroxyalkanoate (hydroxyalkanoic acid), a polycondensate of polycarboxylic acid and polyhydric alcohol, a ring-opening polycondensate of cyclic lactam, or the like.

An aliphatic polyester resin is preferable as the polyester resin (B). Examples of the aliphatic polyester include a polyhydroxyalkanoate (polymer of hydroxyalkanoate), a polycondensate of aliphatic diols and aliphatic carboxylic acids, or the like.

Even among these, from the viewpoint of an improvement to transparency of the resin composition, a polyhydroxyalkanoate is preferable as the polyester resin (B).

The polyester resin (B) may be used alone or in a combination of two or more types.

A compound having a structural unit represented by general formula (PHA) is given as an example of the polyhydroxyalkanoate.

Note that in the compound having a structural unit represented by general formula (PHA), both ends of the polymer chain (ends of the main chain) may be a carboxyl group, and only one end may be a carboxyl group and the other end may be another group (for example, a hydroxyl group).

[Formula 3]

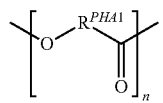

General Formula (PHA)

In general formula (PHA), $R^{PHA1}$ represents an alkylene group having 1 or more and 10 or less carbon atoms. n represents an integer of 2 or more.

In general formula (PHA), an alkylene group having 3 or more and 6 or less carbon atoms is preferable as the alkylene group represented by $R^{PHA1}$. The alkylene group represented by $R^{PHA1}$ may be either a linear shape or branched shape, but a branched shape is preferable.

Here, in general formula (PHA), the fact that $R^{PHA1}$ represents an alkylene group shows that 1) $R^{PHA1}$ has a [O—$R^{PHA1}$—C (=O)—] structure representing the same alkylene group, and 2) $R^{PHA1}$ has a plurality of structures [O—$R^{PHA1}$—C(=O)—] (that is, [O—$R^{PHA1A}$—C(=O)—] [O—$R^{PHA1B}$—C(=O)—] structures) representing different alkylene groups ($R^{PHA1}$ is an alkylene group with a different number of carbon atoms or different branches).

In other words, the polyhydroxyalkanoate may be a homopolymer of one type of hydroxyalkanoate (hydroxyalkanoic acid), and may be a copolymer of two or more types of hydroxyalkanoates (hydroxyalkanoic acid).

In general formula (PHA), the upper limit of n is not particularly limited, but 20,000 or less is given as an example. The scope of n is preferably 500 or more and 10,000 or less, and more preferably 1,000 or more and 8,000 or less.

Examples of the polyhydroxyalkanoate include a homopolymer such as hydroxyalkanoic acid (lactic acid, 2-hydroxybutyric acid, 3-hydroxybutyric acid, 4-hydroxybutyric acid, 2-hydroxy-3-methylbutyric acid, 2-hydroxy-3, 3-dimethylbutyric acid, 3-hydroxyvaleric acid, 4-hydroxyvaleric acid, 5-hydroxyvaleric acid, 3-hydroxyhexanoic acid, 2-hydroxyhexanoic acid, 2-hydroxyisohexanoic acid, 6-hydroxyhexanoic acid, 3-hydroxypropionic acid, 3-hydroxy-2,2-dimethylpropionic acid, 3-hydroxyhexanoic acid, 2-hydroxy-n-octanoic acid, or the like), or a copolymer of two or more of these hydroxyalkanoic acids.

Even among these, from the viewpoint of suppressing a decrease in transparency of the obtained resin-molded body and an improvement to impact resistance, the polyhydroxyalkanoate is preferably a homopolymer of a branched hydroxyalkanoic acid having 2 or more and 4 or less carbon atoms, a homocopolymer of a branched hydroxyalkanoic acid having 2 or more and 4 or less carbon atoms and a branched hydroxyalkanoic acid having 5 or more and 7 or less carbon atoms, more preferably a homopolymer of a branched hydroxyalkanoic acid having 3 carbon atoms (in other words, a polylactic acid), a homocopolymer of 3-hydroxybutyric acid and 3-hydroxyhexanoic acid (in other words, polyhydroxybutyrate-hexanoate), and even more preferably a homopolymer of a branched hydroxyalkanoic acid having 3 carbon atoms.

Note that the number of carbon atoms of the hydroxyalkanoic acid is a number also including the carbon atoms of the carboxyl group.

Polylactic acid is a polymer compound obtained by polymerizing lactic acid through ester linkages.

Examples of the polylactic acid include a homopolymer of L-lactic acid, a homopolymer of D-lactic acid, a block copolymer including a polymer of at least one of L-lactic acid and D-lactic acid, and a graft copolymer including a polymer of at least one of L-lactic acid and D-lactic acid.

Examples of the "compound copolymerizable together with L-lactic acid and D-lactic acid" include a polycarboxylic acid such as glycolic acid, dimethyl glycolic acid, 3-hydroxybutyric acid, 4-hydroxybutyric acid, 2-hydroxypropanoic acid, 3-hydroxypropanoic acid, 2-hydroxyvaleric acid, 3-hydroxyvaleric acid, 4-hydroxyvaleric acid, oxalic acid, malonic acid, succinic acid, glutaric acid, adipic acid, pimelic acid, azelaic acid, sebacic acid, undecanoic acid, dodecanoic acid, terephthalic acid, and anhydrides of these; a polyhydric alcohol such as ethylene glycol, diethylene glycol, triethylene glycol, 1,2-propanediol, 1,3-propanediol, 1,3-butanediol, 1,4-butanediol, 2,3-butanediol, 1,5-pentanediol, 1,6-hexanediol, 1,9-nonanediol, 3-methyl-1,5-pentanediol, neopentyl glycol, tetramethylene glycol, and 1,4-hexanedimethanol; a polysaccharide such as cellulose; an aminocarboxylic acid such as α-amino acids; a hydroxycarboxylic acid such as 5-hydroxyvaleric acid, 2-hydroxycaproic acid, 3-hydroxycaproic acid, 4-hydroxycaproic acid, 5-hydroxycaproic acid, 6-hydroxycaproic acid, 6-hydroxymethyl-caproic acid, and mandelic acid; or a cyclic ester such as glycolide, β-methyl-δ-valerolactone, γ-valerolactone, and ε-caprolactone.

It is known that polylactic acid may be produced by a lactide method through lactide; a direct polymerization method in which lactic acid is heated in a solvent under reduced pressure to polymerize while removing water; or the like.

In polyhydroxybutyrate-hexanoate, from the viewpoint of an improvement to transparency of the resin composition, the copolymerization ratio of 3-hydroxyhexanoic acid (3-hydroxyhexanoate) to a copolymer of 3-hydroxybutyric acid (3-hydroxybutyrate) and 3-hydroxyhexanoic acid (3-hydroxyhexanoate) is preferably 3 mol % or more and 20 mol % or less, more preferably 4 mol % or more and 15 mol % or less, and even more preferably 5 mol % or more and 12 mol % or less.

Note that the method of measuring the copolymerization ratio of 3-hydroxyhexanoic acid (3-hydroxyhexanoate) uses $H^1$-NMR to calculate the hexanoate ratio from the integrated value of the peaks derived from the hexanoate end and the butyrate end.

From the viewpoint of an improvement to transparency of the resin composition, the weight-average molecular weight (Mw) of the polyester resin (B) may be 10,000 or more and 1,000,000 or less (preferably 50,000 or more and 800,000 or less, and more preferably 100,000 or more and 600,000 or less).

The weight-average molecular weight (Mw) of the polyester resin (B) is a value measured by gel permeation chromatography (GPC). Specifically, the molecular weight measurement by GPC is performed using a chloroform solvent, using HLC-8320GPC manufactured by Tosoh (Corp.) as the measurement device, and TSKgel GMHHR-M+ TSKgel GMHHR-M (7.8 mm1.D.30 cm) columns manufactured by Tosoh (Corp.). Also, the weight-average molecular weight (Mw) is calculated using a molecular weight calibration curve created from a monodisperse polystyrene standard sample based on this measurement result.

[Cardanol Composition Containing Cardanol-Based Compound Having Epoxy Group (C): Component (C)]

The resin composition of the present embodiment includes the cardanol composition (C) containing the cardanol-based compound having an epoxy group.

Here, "cardanol composition" represents a mixture of a naturally occurring compound made from cashew, or a derivative of such a mixture. For example, the compounds of the following (1) to (4) are contained in a mixture of a naturally occurring compound made from cashew.

Also, the "cardanol-based compound having an epoxy group" contained in the cardanol composition (C) indicates a compound having an epoxy group in a molecular structure, and a component contained in a naturally occurring compound made from cashew, or a compound having an epoxy group in a molecular structure, and a derivative from the component contained in a naturally occurring compound made from cashew (for example, the compounds of the following (1) to (4)).

[Formula 4]

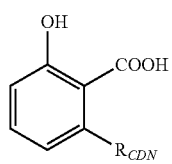
(1)

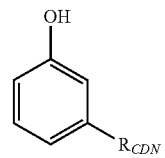
(2)

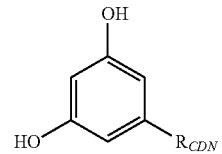
(3)

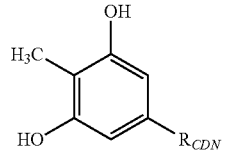
(4)

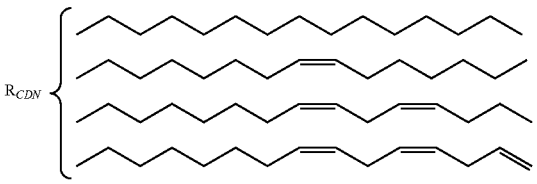

In other words, the resin composition of the present embodiment may include a mixture of a naturally occurring compound made from cashew (hereinafter referred to simply as "cashew-derived mixture") as component (C), wherein the mixture includes the cardanol-based compound having at least an epoxy group.

Furthermore, it may contain a derivative from a mixture of a naturally occurring compound made from cashew (cashew-derived mixture), wherein the derivative includes the cardanol-based compound having at least an epoxy group.

Note that examples of the derivative include the following mixtures, monomers, and the like.

A mixture in which the composition ratio of each component in the cashew-derived mixture is adjusted A simple substance in which only defined components are isolated from the cashew-derived mixture A mixture including a modified product obtained by further modifying the components in the cashew-derived mixture A mixture including a polymer obtained by further polymerizing the components in the cashew-derived mixture A mixture including a modified polymer obtained by further modifying and polymerizing the components in the cashew-derived mixture A mixture including a modified product obtained by further modifying the components in the mixture having an adjusted composition ratio A mixture including a polymer obtained by further polymerizing the components in the mixture having an adjusted composition ratio A mixture including a modified polymer obtained by further modifying and polymerizing the components in the mixture having an adjusted composition ratio A modified product obtained by further modifying the isolated simple substance—A polymer obtained by further polymerizing the isolated simple substance A modified polymer obtained by further modifying and polymerizing the isolated simple substance Note that the polymer also includes multimers such as dimers and trimers.

From the viewpoint of an improvement to transparency of the resin composition, the content rate of the cardanol-based compound having an epoxy group in the cardanol composition (C) is preferably 50% by mass or more, more preferably 60% by mass or more, and even more preferably 75% by mass or more.

Note that the cardanol-based compound having an epoxy group contained in the cardanol composition (C) may have the epoxy group anywhere in the molecular structure. For example, it may have the epoxy group on the benzene ring via a divalent group formed by combining one type of group or two or more types of groups selected from an unsaturated aliphatic group having —O—, an alkyl group, and a double bond.

For example, —OH in the compounds of (1) to (4) is epoxy-modified, and may have the epoxy group on the benzene ring at a position via the group of "—O-$L_{EP}$- ($L_{EP}$ represents a single bond or a divalent linking group)." Furthermore, one portion of the group represented by RCDN in the compounds of (1) to (4) may be present in an epoxidized form.

—General Formula (CDN1)—

The cardanol-based compound having an epoxy group contained in the cardanol composition (C) is preferably a compound of at least one type selected from a compound represented by general formula (CDN1), and a polymer in which the compound represented by general formula (CDN1) has been polymerized.

By including a compound of at least one type selected from a compound represented by general formula (CDN1), and a polymer in which the compound represented by general formula (CDN1) has been polymerized, it becomes likely to improve the transparency of the resin composition.

[Formula 5]

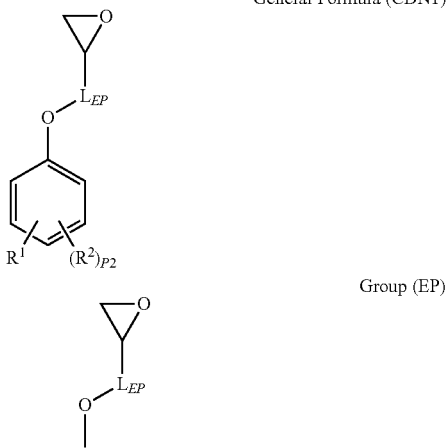

General Formula (CDN1)

Group (EP)

(In general formula (CDN1), $R^1$ represents an alkyl group that may have a substituent group, or an unsaturated aliphatic group that has a double bond and may have a substituent group. $R^2$ represents a group represented by the group (EP), a carboxy group, an alkyl group that may have a substituent group, or an unsaturated aliphatic group that has a double bond and may have a substituent group. P2 represents an integer of 0 or more and 4 or less. Note that each $R^2$, which is present in plurality when P2 is two or more, may be the same group, or may be a different group.

In general formula (CDN1) and group (EP), $L_{EP}$ represents a single bond or a divalent linking group. Note that each $L_{EP}$, which is present in plurality in general formula (CDN1) when there is a group represented by the group (EP) as $R^2$, may be the same group, or may be a different group.)

In general formula (CDN1), the alkyl group that may have a substituent group representing $R^1$ is preferably an alkyl group having 3 or more and 30 or less carbon atoms, more preferably an alkyl group having 5 or more and 25 or less carbon atoms, and even more preferably an alkyl group having 8 or more and 20 or less carbon atoms.

Examples of the substituent group include an epoxy group, a hydroxyl group, or the like.

Examples of the alkyl group that may have a substituent group include a pentadecane-1-yl group, a heptane-1-yl group, an octane-1-yl group, a nonane-1-yl group, a decane-1-yl group, an undecane-1-yl group, a dodecane-1-yl group, a tetradecane-1-yl group, or the like.

In general formula (CDN1), the unsaturated aliphatic group that has a double bond and may have a substituent group representing $R^1$ is preferably an unsaturated aliphatic group having 3 or more and 30 or less carbon atoms, more preferably an unsaturated aliphatic group having 5 or more and 25 or less carbon atoms, and even more preferably an unsaturated aliphatic group having 8 or more and 20 or less carbon atoms.

The number of double bonds of the unsaturated aliphatic group is preferably 1 or more and 3 or less.

Those listed as examples of the substituent group of the alkyl group are similarly given as examples of the substituent group.

Examples of the unsaturated aliphatic group that has a double bond and may have a substituent group include a pentadeca-8-en-1-yl group, a pentadeca-8,11-dien-1-yl group, a pentadeca-8,11,14-trien-1-yl group, a pentadeca-7-en-1-yl group, a pentadeca-7,10-dien-1-yl group, a pentadeca-7,10,14-trien-1-yl group, or the like.

In general formula (CDN1), a pentadeca-8-en-1-yl group, a pentadeca-8,11-dien-1-yl group, a pentadeca-8,11,14-trien-1-yl group, a pentadeca-7-en-1-yl group, a pentadeca-7,10-dien-1-yl group, or a pentadeca-7,10,14-trien-1-yl group are preferable as $R^1$.

Those listed as examples of the alkyl group that may have a substituent group and the unsaturated aliphatic group that has a double bond and may have a substituent group representing $R^1$ are similarly given as preferred examples of the alkyl group that may have a substituent group and the unsaturated aliphatic group that has a double bond and may have a substituent group representing $R^2$ in general formula (CDN1).

In general formula (CDN1) and group (EP), examples of the divalent linking group representing $L_{EP}$ include an alkylene group that may have a substituent group (preferably an alkylene group having 1 or more and 4 or less carbon atoms, and more preferably an alkylene group having 1 carbon atom), —CH$_2$CH$_2$OCH$_2$CH$_2$— group, or the like.

Note that those listed as examples of the substituent group in $R^1$ of the general formula (CDN1) are similarly given as examples of the foregoing substituent group.

A methylene group is preferable as $L_{EP}$.

The polymer in which the compound represented by general formula (CDN1) is polymerized refers to a polymer in which at least two or more of the compound represented by general formula (CDN1) are polymerized through or without a linking group.

A compound represented by the following general formula (CDN2) is given as an example of the polymer in which the compound represented by general formula (CDN1) is polymerized.

[Formula 6]

General Formula (CDN2)

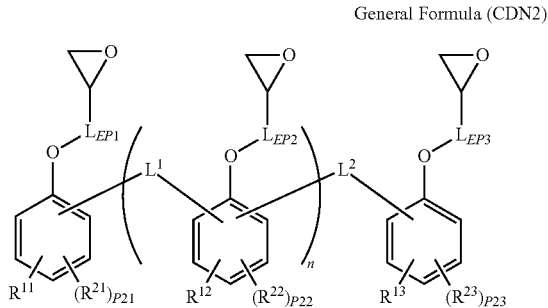

(In general formula (CDN2), $R^{11}$, $R^{12}$, and $R^{13}$ each independently represent an alkyl group that may have a substituent group, or an unsaturated aliphatic group that has a double bond and may have a substituent group. $R^{21}$, $R^{22}$ and $R^{23}$ each independently represent a group represented by the group (EP), a carboxy group, an alkyl group that may have a substituent group, or an unsaturated aliphatic group that has a double bond and may have a substituent group. P21 and P23 each independently represent an integer of 0 or more and 3 or less, and P22 represents an integer of 0 or more and 2 or less. $L^1$ and $L^2$ each independently represent a divalent linking group. n represents an integer of 0 or more and 10 or less. $L_{EP1}$, $L_{EP2}$, and $L_{EP3}$ each independently represent a single bond or a divalent linking group. Note that each $R^{21}$, which is present in plurality when P21 is two or more, each $R^{22}$, which is present in plurality when P22 is two or more, and each $R^{23}$, which is present in plurality when P23 is two or more, may be the same group, or may be a different group. Furthermore, each $R^{12}$, $R^{22}$, $L^1$, and $L_{EP2}$, which are present in plurality when n is two or more, may be the same group, or may be a different group, and each P22, which is present in plurality when n is two or more, may be the same number, or may be a different number.)

Those listed as examples of the alkyl group that may have a substituent group and the unsaturated aliphatic group that has a double bond and may have a substituent group representing $R^1$ in the general formula (CDN1) are similarly given as preferable examples of the alkyl group that may have a substituent group and the unsaturated aliphatic group that has a double bond and may have a substituent group representing $R^{11}$, $R^{12}$, $R^{13}$, $R^{21}$, $R^{22}$, and $R^{23}$ in general formula (CDN2).

Note that those listed as examples of the divalent linking group representing $L_{EP}$ in the general formula (CDN1) are similarly given as examples of the divalent linking group representing $L_{EP1}$, $L_{EP2}$, and $L_{EP3}$ in general formula (CDN2).

An alkylene group that may have a substituent group (preferably an alkylene group having 1 or more and 15 or less carbon atoms, and more preferably an alkylene group having 1 or more and 2 or less carbon atoms) is given as an example of the divalent linking group representing $L^1$ and $L^2$ in general formula (CDN2).

Note that those listed as examples of the substituent group in $R^1$ of the general formula (CDN1) are similarly given as examples of the foregoing substituent group.

In general formula (CDN2), n is preferably 0 or more and 3 or less, and more preferably 0 or more and 1 or less.

Furthermore, the polymer in which the compound represented by general formula (CDN1) is polymerized may be, for example, a polymer in which at least three or more of the compound represented by general formula (CDN1) are three-dimensionally cross-linked and polymerized through or without a linking group. A compound having a structure such as the following is given as an example of the polymer in which the compound represented by the general formula (CDN1) is three-dimensionally crosslinked and polymerized.

[Formula 7]

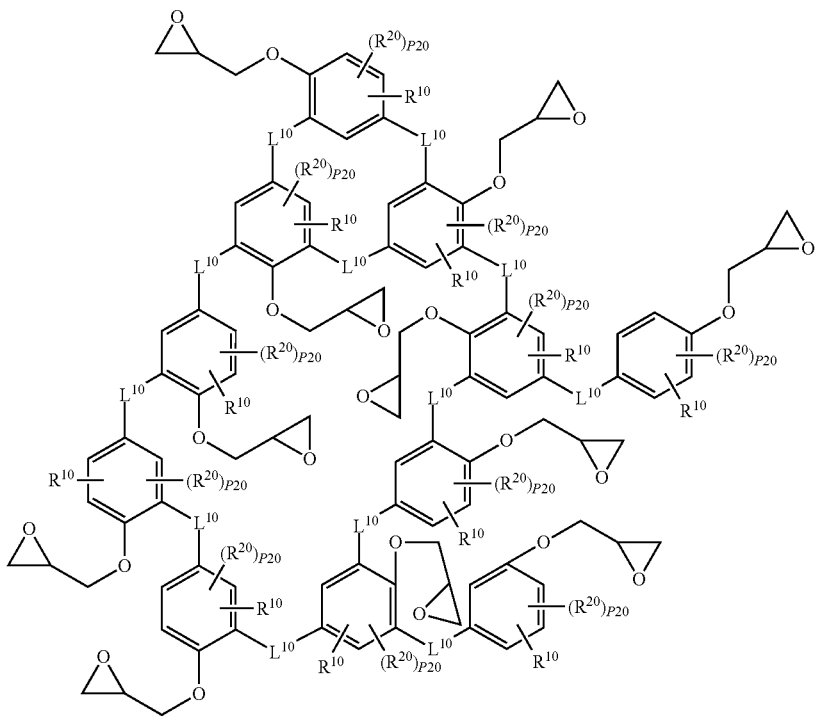

(In the foregoing structural formula, $R^{10}$, $R^{20}$, P20 and $L^{10}$ are synonyms for $R^1$, $R^2$, P2, and $L^1$ in the general formula (CDN1), respectively. Note that each $R^{10}$, $R^{20}$, and $L^{10}$, which are present in plurality, may be the same group, or may be a different group. Each P20, which is present in plurality, may have the same number, or a different number.)

Note that although the foregoing structural formula shows an aspect where there is a methyl group between the epoxy group and the oxygen atom (—O—), there may be an aspect wherein the epoxy group and the oxygen atom (—O—) are directly bonded, and a divalent linking group other than a methyl group may be interposed.

Furthermore, a polymer in which at least two or more of the compound represented by general formula (CDN1) having an "unsaturated aliphatic group that has a double bond and may have a substituent group" as $R^1$ are polymerized at the position of the double bond in the unsaturated aliphatic group is also given as an example of the polymer in which the compound represented by general formula (CDN1) is polymerized.

This polymer obtained by polymerization at the position of the double bond in the unsaturated aliphatic group may be, for example, a dimer in which two of the compound represented by general formula (CDN1) are bound, and may be a oligomer or polymer in which three or more of the compound are bound.

A commercial product may be used as the cardanol composition (C) containing the cardanol-based compound having an epoxy group (component (C)). For example, the following commercial products may be used.

Examples of commercial products include NC-513, NC-514S, NC-547, LITE 513E, Ultra LITE 513 manufactured by Cardolite Corporation, or the like.

From the viewpoint of an improvement to transparency of the resin composition, the epoxy equivalent of the cardanol composition (C) (component (C)) is preferably 500 or less, more preferably 480 or less, and even more preferably 470 or less.

Note that from the viewpoint of molding processability, the lower limit of the epoxy equivalent of component (C) is preferably 300 or more, more preferably 350 or more, and even more preferably 400 or more.

Measurement of the epoxy equivalent of the cardanol composition (C) (component (C)) is performed according to ISO 3001.

[Polymer (D): Component (D)]

The polymer (D) is a polymer of at least one type selected from a polymer with a core-shell structure having a core layer and a shell layer including a polymer of alkyl (meth)acrylate on the surface of the core layer, and an olefin polymer including 60% by mass or more of a structural unit derived from an α-olefin.

The polymer (D) may have, for example, elasticity at room temperature (25° C.) and the same softening property as thermoplastic resins at high temperatures (thermoplastic elastomers).

When the polymer (D) is contained in the resin composition, plasticization is facilitated when injection molding the resin composition.

The polymer (D) may be used alone or in a combination of two or more types.

(Polymer With a Core-Shell Structure)

The polymer with a core-shell structure of the present embodiment is a polymer with a core-shell structure having a core layer and a shell layer on the surface of the core layer.

The polymer with a core-shell structure is a polymer wherein the core layer is the innermost layer, and the shell layer is the outermost layer (specifically, a polymer is formed as the shell layer wherein a polymer of alkyl (meth)acrylate is graft polymerized to a polymer serving as the core layer).

Note that there may be one or more other layers (for example, 1 or more and 6 or less other layers) between the core layer and the shell layer. Note that when there are other layers, the polymer with a core-shell structure may be a multi-layered polymer wherein a plurality of types of polymers is graft polymerized to the polymer serving as the core layer.

Although the core layer is not particularly limited, it is preferably a rubber layer. Examples of the rubber layer include a layer of (meth)acrylic rubber, silicone rubber, styrene rubber, conjugated diene rubber, α-olefin rubber, nitrile rubber, urethane rubber, polyester rubber, polyamide rubber, a copolymer rubber of two or more types of these, or the like.

Even among these, the rubber layer is preferably a layer of (meth)acrylic rubber, silicone rubber, styrene rubber, conjugated diene rubber, α-olefin rubber, a copolymer rubber of two or more types of these, or the like.

Note that the rubber layer may be a rubber layer cross-linked by copolymerizing a cross-linking agent (divinylbenzene, allyl acrylate, butylene glycol diacrylate, or the like).

A polymer rubber obtained by polymerizing a (meth) acrylic component (for example, an alkyl ester of (meth) acrylic acid having 2 or more and 6 or less carbon atoms, or the like) is given as an example of the (meth)acrylic rubber.

A rubber configured of a silicon component (polydimethylsiloxane, polyphenylsiloxane, or the like) is given as an example of the silicon rubber.

A polymer rubber obtained by polymerizing a styrene component (styrene, α-methylstyrene, or the like) is given as an example of the styrene rubber.

A polymer rubber obtained by polymerizing a conjugated diene component (butadiene, isoprene, or the like) is given as an example of the conjugated diene rubber.

A polymer rubber obtained by polymerizing an α-olefin component (ethylene, propylene, and 2-methylpropylene) is given as an example of the α-olefin rubber.

A copolymer rubber obtained by polymerizing two or more types of (meth)acrylic components, a copolymer rubber obtained by polymerizing a (meth)acrylic component and a silicon component, and a copolymer rubber of a (meth)acrylic component, a conjugated diene component, and a styrene component, or the like, are given as examples of the copolymer rubber.

In a polymer configuring the shell layer, examples of the alkyl (meth)acrylate include methyl (meth)acrylate, ethyl (meth)acrylate, n-propyl (meth)acrylate, n-butyl (meth) acrylate, t-butyl (meth)acrylate, n-hexyl (meth)acrylate, 2-ethylhexyl (meth)acrylate, cyclohexyl (meth)acrylate, stearyl (meth)acrylate, octadecyl (meth)acrylate, or the like. In the alkyl (meth)acrylate, at least one portion of hydrogen in the alkyl chain may be substituted. Examples of the substituent group include an amino group, a hydroxyl group, a halogen group, or the like.

Even among these, from the viewpoint of an improvement to transparency of the resin composition in addition to plasticization facilitation when injection molding the resin composition, a polymer of alkyl (meth)acrylate wherein the number of carbon atoms in the alkyl chain is 1 or more and 8 or less is preferable as the polymer of alkyl (meth)acrylate, a polymer of alkyl (meth)acrylate wherein the number of carbon atoms in the alkyl chain is 1 or more and 2 or less is more preferable, and a polymer of alkyl (meth)acrylate wherein the number of carbon atoms in the alkyl chain is 1 is even more preferable. A copolymer of two or more types of alkyl acrylate wherein the number of carbon atoms in the alkyl chains is different particularly preferable.

The polymer configuring the shell layer may be a polymer obtained by polymerizing at least one selected from a glycidyl group-containing vinyl compound and an unsaturated dicarboxylic acid anhydride in addition to the alkyl (meth)acrylate.

Examples of the glycidyl group-containing vinyl compound include glycidyl (meth)acrylate, glycidyl itaconate, itaconic acid diglycidyl, allyl glycidyl ether, styrene-4-glycidyl ether, 4-glycidyl styrene, or the like.

Examples of the unsaturated dicarboxylic acid anhydride include maleic anhydride, itaconic anhydride, glutaconic anhydride, citraconic anhydride, aconitic anhydride, or the like. Even among these, maleic anhydride is preferable.

Note that a layer of the polymer described in the shell layer is listed as an example of the one or more other layers between the core layer and the shell layer.

The content of the polymer of the shell layer, with respect to the entire polymer with a core-shell structure, is preferably 1% by mass or more and 40% by mass or less, more preferably 3% by mass or more and 30% by mass or less, and even more preferably 5% by mass or more and 15% by mass or less.

Although the average primary particle size of the polymer with a core-shell structure is not particularly limited, from the viewpoint of an improvement to transparency of the resin composition in addition to plasticization facilitation when injection molding the resin composition, 50 nm or more and 500 nm or less is preferable, 50 nm or more and 400 nm or less is more preferable, 100 nm or more and 300 nm or less is even more preferable, and 150 nm or more and 250 nm or less is particularly preferable.

Note that the average primary particle size refers to a value measured by the following method. Particles are observed using a scanning electron microscope, the maximum size of the primary particles is taken as the primary particle size, then the primary particle size of 100 particles is measured, and this is the averaged number average primary particle size. Specifically, this may be found by observing the dispersion morphology of the polymer with a core-shell structure in the resin composition using a scanning electron microscope.

The polymer with a core-shell structure may be prepared by a well-known method.

An emulsion polymerization method is given as an example of a well-known method. Specifically, the following method is exemplified as a production method. First, after emulsion-polymerizing a mixture of monomers to create core particles (core layer), another mixture of monomers is emulsion-polymerized in the presence of the core particles (core layer) to create a polymer with a core-shell structure wherein a shell layer is formed around the core particles (core layer).

Furthermore, when forming another layer between the core layer and the shell layer, emulsion polymerization of another mixture of monomers is repeated to obtain the polymer with a core-shell structure configured from the target core layer, other layers, and shell layer.

"METAPRENE" (registered trademark) manufactured by Mitsubishi Chemical (Corp.), "Kane Ace" (registered trademark) manufactured by Kaneka (Corp.), "PARALOID" (registered trademark) manufactured by Dow Chemical Japan (Ltd.), "STAPHYLOID" (registered trademark) manufactured by Aica Kogyo (Co., Ltd.), "PARAFACE" (registered trademark) manufactured by Kuraray (Co., Ltd.), or the like are given as examples of commercially available products of polymers with a core-shell structure.

(Olefin Polymer)

The olefin polymer is preferably a polymer of an α-olefin and alkyl (meth)acrylate, wherein the olefin polymer includes 60% by mass or more of a structural unit derived from the α-olefin.

In the olefin polymer, examples of the α-olefin include ethylene, propylene, 2-methyl propylene, or the like. From the viewpoint of an improvement to transparency the resin composition, an α-olefin having 2 or more and 8 or less carbon atoms is preferable, and an α-olefin having 2 or more and 3 or less carbon atoms is more preferable. Even among these, ethylene is more preferable.

Meanwhile, examples of the alkyl (meth)acrylate that polymerizes with the α-olefin include methyl (meth)acrylate, ethyl (meth)acrylate, n-propyl (meth)acrylate, n-butyl (meth)acrylate, t-butyl (meth)acrylate, n-hexyl (meth)acrylate, 2-ethylhexyl (meth)acrylate, cyclohexyl (meth)acrylate, stearyl (meth)acrylate, octadecyl (meth)acrylate, or the like. From the viewpoint of an improvement to transparency of the resin composition, an alkyl (meth)acrylate wherein the number of carbon atoms in the alkyl chain is 1 or more and 8 or less is preferable, an alkyl (meth)acrylate wherein the number of carbon atoms in the alkyl chain is 1 or more and 4 or less is more preferable, and an alkyl (meth)acrylate wherein the number of carbon atoms in the alkyl chain is 1 or more and 2 or less is even more preferable.

Here, from the viewpoint of an improvement to transparency of the resin composition, a polymer of ethylene and methyl acrylate and a polymer of ethylene and ethyl acrylate are preferable as the olefin polymer.

From the viewpoint of an improvement to transparency of the resin composition, in the olefin polymer, it is preferable to include 60% by mass or more and 97% by mass or less of a structural unit derived from an α-olefin, and including 70% by mass or more and 85% by mass or less is more preferable.

The olefin polymer may have another structural unit other than a structural unit derived from an α-olefin and a structural unit derived from an alkyl (meth)acrylate. However, the other structural unit may be 10% by mass or less to all structural units in the olefin polymer.

[Poly(meth)acrylate Compound (E): Compound (E)]

The poly(meth)acrylate compound (E) is a compound (resin) including 50% by mass or more of a structural unit derived from an alkyl (meth)acrylate (preferably 70% by mass or more, more preferably 90% by mass or more, and even more preferably 100% by mass).

If the poly(meth)acrylate compound (E) is contained in the matrix of the resin composition, the modulus of elasticity of the obtained resin-molded body will likely improve.

The poly(meth)acrylate compound (E) may include a structural unit derived from a monomer other than a (meth)acrylate.

Note that the structural unit of the poly(meth)acrylate compound (E) (unit derived from a monomer) may be a singular type, or may be two or more types.

Furthermore, the poly(meth)acrylate compound (E) may be used alone or in a combination of two or more types.

Examples of the alkyl (meth)acrylate include methyl (meth)acrylate, ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-decyl (meth)acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth) acrylate, isooctyl (meth)acrylate, 2-ethylhexyl (meth)acrylate, octyl (meth)acrylate, decyl (meth)acrylate, cyclohexyl (meth)acrylate, dicyclopentanyl (meth)acrylate, or the like.

Even among these, from the viewpoint of an improvement to transparency of the resin composition in addition to an improvement to the modulus of elasticity of the resin-molded body, an alkyl (meth)acrylate wherein the number of carbon atoms in the alkyl chain is 1 or more and 8 or less (preferably 1 or more and 4 or less, more preferably 1 or more and 2 or less, and even more preferably 1) is sufficient as the alkyl (meth)acrylate.

The shorter the alkyl chain of the poly(meth)acrylate compound (E), the closer the SP value is to that of the polyester resin (B); thus, the compatibility of the poly(meth) acrylate compound (E) and the polyester resin (B) improves, and haze improves.

In other words, a polymer including 50% by mass or more (preferably 70% by mass or more, more preferably 90% by mass or more, and even more preferably 100% by mass) of a structural unit derived from an alkyl (meth)acrylate wherein the number of carbon atoms in the alkyl chain is 1 or more and 8 or less (preferably 1 or more and 4 or less, more preferably 1 or more and 2 or less, and even more preferably 1) is sufficient for the poly(meth)acrylate compound (E).

Also, a polymer wherein the structural unit derived from an alkyl (meth)acrylate wherein the number of carbon atoms in the alkyl chain is 1 or more and 8 or less (preferably 1 or more and 4 or less, more preferably 1 or more and 2 or less, and even more preferably 1) is 100% by mass is sufficient as the poly(meth)acrylate compound (E). In other words, a polyalkyl(meth)acrylate wherein the number of carbon atoms in the alkyl chain is 1 or more and 8 or less (preferably 1 or more and 4 or less, more preferably 1 or more and 2 or less, and even more preferably 1) is sufficient as the poly (meth)acrylate compound (E). Note that a polymethyl methacrylate is preferable for the polyalkyl(meth)acrylate wherein the number of carbon atoms in the alkyl chain is 1.

Note that in the poly(meth)acrylate compound (E), examples of a monomer other than alkyl (meth)acrylate include styrenes [for example, a monomer having a styrene skeleton, such as styrene, alkyl-substituted styrene (for example, α-methyl styrene, 2-methyl styrene, 3-methyl styrene, 4-methyl styrene, 2-ethyl styrene, 3-ethyl styrene, 4-ethyl styrene, or the like), halogen-substituted styrene (for example, 2-chlorostyrene, 3-chlorostyrene, 4-chlorostyrene, or the like), vinyl naphthalene (2-vinyl naphthalene or the like), hydroxy styrene (4-ethenylphenol or the like), or the like], unsaturated dicarboxylic acid anhydrides [for example, "a compound having an ethylenic double bond and a dicarboxylic acid anhydride group," such as maleic anhydride, itaconic anhydride, glutaconic anhydride, citraconic anhydride, aconitic anhydride, or the like], or the like.

The weight-average molecular weight (Mw) of the poly (meth)acrylate compound (E) is not particularly limited, but 15,000 or more and 120,000 or less (preferably more than 20,000 and 100,000 or less, more preferably 22,000 or more and 100,000 or less, and even more preferably 25,000 or more and 100,000 or less) is sufficient.

In particular, from the viewpoint of an improvement to transparency of the resin composition in addition to an improvement to the modulus of elasticity of the resin-molded body, the weight-average molecular weight (Mw) of the poly(meth)acrylate compound (E) is preferably less than 50,000 (in other words, less than 50,000), more preferably 40,000 or less, and even more preferably 35,000 or less. However, 15,000 or more is sufficient for the weight-average molecular weight (Mw) of the poly(meth)acrylate compound (E).

The weight-average molecular weight (Mw) of the poly (meth)acrylate compound (E) is a value measured by gel permeation chromatography (GPC). Specifically, the molecular weight measurement by GPC is performed using a tetrahydrofuran solvent, using HLC-8320GPC manufactured by Tosoh (Corp.) as the measurement device, and TSKgelα-M columns manufactured by Tosoh (Corp.). Also, the weight-average molecular weight (Mw) is calculated using a molecular weight calibration curve created from a monodisperse polystyrene standard sample based on this measurement result.

[Content or Mass Ratio of Component (A) to Component (E)]

The content or mass ratio of each component will be described. From the viewpoint of an improvement to transparency of the resin composition, the following ranges are preferable for the content or mass ratios of each component. Note that the abbreviations of each component are as follows.

Component (A)=cellulose acylate (A)
Component (B)=polyester resin (B)
Compound (C)=cardanol composition containing a cardanol-based compound having an epoxy group (C)
Component (D)=polymer (D)
Component (E)=poly(meth)acrylate compound (E)

The mass ratio (B/A) of component (B) to component (A) is preferably 0.05 or more and 0.5 or less, more preferably 0.06 or more and 0.35 or less, and even more preferably 0.075 or more and 0.25 or less.

The mass ratio (C/A) of component (C) to component (A) is preferably 0.01 or more and 0.3 or less, more preferably 0.03 or more and 0.25 or less, and even more preferably 0.05 or more and 0.2 or less.

The mass ratio (C/B) of component (C) to component (B) is preferably 0.15 or more and 3.75 or less, more preferably 0.5 or more and 3 or less, and even more preferably 0.75 or more and 2 or less.

The mass ratio (C/(A+B+C)) of component (C) to the total of component (A), component (B), and component (C) is preferably 0.015 or more and 0.245 or less, more preferably 0.05 or more and 0.2 or less, and even more preferably 0.075 or more and 0.2 or less.

The mass ratio (D/A) of component (D) to component (A) is preferably 0.03 or more and 0.2 or less, more preferably 0.03 or more and 0.15 or less, and even more preferably 0.05 or more and 0.125 or less.

The mass ratio (E/A) of component (E) to component (A) is preferably 0.01 or more and 0.2 or less, more preferably 0.01 or more and 0.1 or less, and even more preferably 0.03 or more and 0.075 or less.

Here, the content of component (A) to the resin composition is preferably 50% by mass or more, more preferably 60% by mass or more, and even more preferably 70% by mass or more.

[Other Components]

The resin composition of the present embodiment may include other components.

Examples of such other components include flame retardants, compatibilizers, antioxidants, mold release agents, light resistance agents, weather-proofing agents, colorants, pigments, modifiers, anti-drip agents, antistatic agents, anti-hydrolysis agents, fillers, reinforcing agents (such as glass fibers, carbon fibers, talc, clay, mica, glass flakes, milled glass, glass beads, crystalline silica, alumina, silicon nitride, aluminum nitride, and boron nitride), or the like.

Furthermore, components (additives) such as an acid acceptor for preventing the release of acetic acid and a reactive trapping agent may be added if necessary. Examples of acid acceptors include oxides such as magnesium oxide, aluminum oxide, or the like; metal hydroxides such as magnesium hydroxide, calcium hydroxide, aluminum hydroxide, hydrotalcite, or the like; calcium carbonate; talc; or the like.

Examples of reactive trapping agents include an epoxy compound, acid anhydride compound, carbodiimide, or the like.

—Ester Compound—

Furthermore, an ester compound may be included.

The ester compound is a compound having an ester group (—C(=O)O—), and having a molecular weight of 250 or more and 2,000 or less (preferably 250 or more and 1,000 or less, and more preferably 250 or more and 600 or less).

The ester compound may be used alone or in a combination of two or more types.

Note that when two or more types of ester compounds are used in combination, ester compounds each having a molecular weight of 250 or more and 2,000 or less are used in combination.

Examples of the ester compound include a fatty acid ester compound, an aromatic carboxylic acid ester compound, or the like.

Even among these, from the viewpoint of an improvement to transparency of the resin composition, a fatty acid ester compound is preferable as the ester compound.

Examples of the fatty acid ester compound include an aliphatic monocarboxylic acid ester (acetic acid esters or the like), an aliphatic dicarboxylic acid ester (succinates, adipate-containing compounds, azelaic acid esters, sebacic esters, stearates, or the like), an aliphatic tricarboxylic acid ester (citrates, isocitrates, or the like), an ester-containing epoxidized compound (epoxidized soybean oil, epoxidized linseed oil, epoxidized rapeseed fatty acid isobutyl, or epoxidized fatty acid 2-ethylhexyl), a fatty acid methyl ester, a sucrose ester, or the like.

Examples of the aromatic carboxylic acid ester compound include dimethyl phthalate, diethyl phthalate, bis(2-ethylhexyl) phthalate, terephthalate, or the like.

Even among these, from the viewpoint of an improvement to transparency of the resin composition, an aliphatic dicarboxylic acid ester and an aliphatic tricarboxylic acid ester are preferable, an adipate-containing compound and a citrate are more preferable, and an adipate-containing compound is even more preferable.

An adipate-containing compound (a compound including an adipate) indicates a compound of an adipate alone, or a mixture of an adipate and a component other than an adipate (a compound different to an adipate). However, the adipate-containing compound may include 50% by mass or more of an adipate with respect to all components.

An adipic acid diester is given as an example of the adipate. Specifically, an adipic acid diester or the like represented by the following general formula (AE) is given as an example.

[Formula 8]

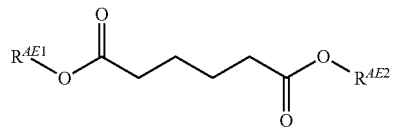

General Formula (AE)

In general formula (AE), $R^{AE1}$ and $R^{AE2}$ each independently represent an alkyl group, or a polyoxyalkyl group $[-(C_xH_{2x}-O)_y-R^{A1}]$ (however, $R^{A1}$ represents an alkyl group, x represents an integer of 1 or more and 10 or less, and y represents an integer of 1 or more and 10 or less).

In general formula (AE), the alkyl groups represented by $R^{AE1}$ and $R^{AE2}$ are preferably alkyl groups wherein the number of carbon atoms is 1 or more and 6 or less, and more preferably alkyl groups wherein the number of carbon atoms 1 or more and 4 or less. The alkyl groups represented by $R^{AE1}$ and $R^{AE2}$ may be any of a linear shape, branched shape, and cyclic shape, but a linear shape or a branched shape is preferable.

In general formula (AE), in the polyoxyalkyl groups represented by $R^{AE1}$ and $R^{AE2}$ $[-(C_xH_{2x}-O)_y-R^{A1}]$, the alkyl group represented by $R^{A1}$ is preferably an alkyl group having 1 or more and 6 or less carbon atoms, and more preferably an alkyl group having 1 or more and 4 or less carbon atoms. The alkyl group represented by $R^{A1}$ may be any of a linear shape, branched shape, or cyclic shape, but a linear shape or a branched shape is preferable.

In general formula (AE), the groups represented by each reference numeral may be substituted with a substituent group. An alkyl group, an aryl group, a hydroxyl group, or the like are given as examples of the substituent group.

Meanwhile, an alkyl ester of citric acid having 1 or more and 12 or less carbon atoms (preferably 1 or more and 8 or less) is given as an example of a citrate. The citrate may be a citrate acylated using an alkyl carboxylic acid anhydride (for example, a linear or branched alkyl carboxylic acid anhydride wherein the number of carbon atoms is 2 or more and 6 or less (preferably 2 or more and 3 or less), such as acetic anhydride, propionic anhydride, butyric anhydride, and valeric anhydride).

The content of each of these other components is preferably 0% by mass or more and 5% by mass or less to the total amount of the resin composition. Here, "0% by mass" means that another component is not contained.

The resin composition of the present embodiment may contain another resin other than the resins (cellulose acylate (A), polyester resin (B), cardanol composition (C), polymer (D), poly(meth)acrylate (E), or the like). However, when another resin is included, 5% by mass or less is sufficient for the content of the other resin to the total amount of the resin composition, and less than 1% by mass is preferable. It is more preferable that another resin is not contained (in other words, 0% by mass).

Examples of another resin include conventionally known thermoplastic resins, specifically, polycarbonate resin; polypropylene resin; polyester resin; polyolefin resin; polyester carbonate resin; polyphenylene ether resin; polyphenylene sulfide resin; polysulfone resin; polyether sulfone resin; polyarylene resin; polyetherimide resin; polyacetal resin; polyvinyl acetal resin; polyketone resin; polyether ketone resin; polyether ether ketone resin; polyaryl ketone resin; polyether nitrile resin; liquid crystal resin; polybenzimidazole resin; polyparabanic acid resin; vinyl-based polymer or copolymer obtained by polymerizing or copolymerizing one or more types of vinyl monomers selected from a group composed of aromatic alkenyl compounds, methacrylates, acrylates, and vinyl cyanide compounds; diene-aromatic alkenyl compound copolymer; vinyl cyanide-diene-aromatic alkenyl compound copolymer; aromatic alkenyl compound-diene-vinyl cyanide-N-phenylmaleimide copolymer; vinyl cyanide-(ethylene-propylene-diene (EPDM))-aromatic alkenyl compound copolymer; vinyl chloride resin; chlorinated vinyl chloride resin; or the like. These resins may be used alone or in a combination of two or more types.

[Method of Producing Resin Composition]

The resin composition of the present embodiment is produced by melting and kneading a mixture including, for example, the cellulose acylate (A), the polyester resin (B), and the cardanol composition (C), and if necessary, other components or the like. Additionally, the resin composition of the present embodiment is also produced by, for example, dissolving the components in a solvent.

Well-known means is given as the means of melting and kneading, and specifically, examples include using a twin screw extruder, Henschel mixer, Banbury mixer, single screw extruder, multi-screw extruder, ko-kneader, or the like.

<Resin-Molded Body>

The resin-molded body of the present embodiment includes the resin composition of the present embodiment. In other words, the resin-molded body of the present embodiment is configured of the same composition as the resin composition of the present embodiment.

From the viewpoint of having a high degree of freedom in terms of shape, the method of molding the resin-molded body of the present embodiment is preferably injection molding. From this viewpoint, the resin-molded body is preferably an injection-molded body obtained by injection molding.

The cylinder temperature for injection molding is, for example, 160° C. or more and 280° C. or less, and preferably 180° C. or more and 240° C. or less. The mold temperature for injection molding is, for example, 40° C. or more and 90° C. or less, and more preferably 40° C. or more and 60° C. or less.

Injection molding may be performed using a commercial device such as, for example, NEX500 manufactured by Nissei Plastic Industrial Co., Ltd., NEX150 manufactured by Nissei Plastic Industrial Co., Ltd., NEX70000 manufactured by Nissei Plastic Industrial Co., Ltd., PNX40 manufactured by Nissei Plastic Industrial Co., Ltd., and SE50D manufactured by Sumitomo Industries, Ltd., or the like.

The molding method for obtaining the resin-molded body of the present embodiment is not limited to the above-described injection molding, and examples that may be applied include extrusion molding, blow molding, heat press molding, calendar molding, coating molding, casting molding, dipping molding, vacuum molding, transfer molding, and the like.

The resin-molded body of the present embodiment is suitable for use in electronic and electrical equipment, office equipment, home appliances, automobile interior materials, toys, containers, and the like. More specifically, housings for electronic and electrical equipment and home appliances; various components for electronic and electrical equipment and home appliances; interior components for automobiles, block assembled toys; plastic model kits; storage cases for CD-ROMs, DVDs, and the like; tableware; drink bottles; food trays; wrapping materials; film; sheets; and the like.

Examples

The present invention will be described in further detail by presenting examples below; however, the present invention is not limited to these examples. Note that "part" represents "parts by mass" unless otherwise noted.

<Preparation of Each Material>

The following materials were prepared.

(Preparation Cellulose Acylate (A))

CA1: "CAP482-20 (Eastman Chemical Company)", cellulose acetate propionate

CA2: "CAP482-0.5 (Eastman Chemical Company)", cellulose acetate propionate

CA3: "CAP504-0.2 (Eastman Chemical Company)", cellulose acetate propionate

CA4: "CAB171-15 (Eastman Chemical Company)", cellulose acetate butyrate

CA5: "CAB381-20 (Eastman Chemical Company)", cellulose acetate butyrate

CA6: "CAB551-0.2 (Eastman Chemical Company)", cellulose acetate butyrate

CA7: "(L-50 (Daicel (Corp.))", diacetyl cellulose

CA8: "(LT-35 (Daicel (Corp.))", triacetyl cellulose (Preparation of Polyester Resin (B))

PE1: "Ingeo3001D (NatureWorks), polylactic acid

PE2: "TERRAMAC TE2000 (Unitika (Ltd.)", polylactic acid

PE3: "LACEA H100 (Mitsui Chemicals (Inc.)", polylactic acid

PE4: "AONILEX X151A, Kaneka (Corp.)", polyhydroxybutyrate-hexanoate

PE5: "AONILEX X131A, Kaneka (Corp.)", polyhydroxybutyrate-hexanoate

PE6: "VYLOPET EMC500 (Toyobo (Co., Ltd.)", polyethylene terephthalate (Preparation of Cardanol Composition (C))

CN1: "Ultra LITE 513 (Cardolite)", cardanol glycidyl ether, epoxy equivalent: 450

CN2: "NC-514S (Cardolite)", bifunctional epoxy compound derived from cardanol, epoxy equivalent: 420

CN3: Synthesized hydrogenated cardanol glycidyl ether 2-(3-pentadecyl phenoxymethyl)oxirane, epoxy equivalent: 450

CN4: "NC-547 (Cardolite)", trifunctional epoxy compound derived from cardanol, epoxy equivalent: 550

CN5: "NX-2026 (Cardolite)", cardanol without an epoxy group (Preparation of Polymer (D))

AE1: "METAPRENE W-600A (Mitsubishi Chemical (Corp.))", polymer with a core-shell structure (a polymer formed as the shell layer by graft polymerizing a "homopolymer rubber of methyl methacrylate and 2-ethylhexyl acrylate" to a "copolymer rubber of 2-ethylhexyl acrylate and n-butyl acrylate" serving as the core layer), average primary particle size=200 nm AE2: "METAPRENE S-2006 (Mitsubishi Chemical (Corp.))", polymer with a core-shell structure (a polymer composed of "silicone/acrylic rubber" as the core layer, and a "polymer of methyl methacrylate" as the shell layer), average primary particle size=200 nm AE3: "PARALOID EXL-2315 (Dow Chemical Japan (Ltd.))", polymer with a core-shell structure (a polymer formed as the shell layer by graft polymerizing a "polymer of methyl methacrylate" to a "rubber containing polybutyl acrylate as the main component" serving as the core layer), average primary particle size=300 nm AE4: "Lotoryl 29MA03 (Arkema)", olefin polymer (a copolymer of ethylene and methyl acrylate, wherein the olefin polymer includes 71% by mass of a structural unit derived from ethylene)
(Preparation of Poly(meth)acrylate) Compound (E))
PM1: "DELPET 720V (Asahi Kasei (Corp.))", polymethylmethacrylate (PMMA), Mw=55,000
PM2: "DELPET 500V (Asahi Kasei (Corp.))", polymethylmethacrylate (PMMA), Mw=25,000
PM3: "SUMIPEX MHF (Sumitomo Chemical Company (Ltd.))", polymethylmethacrylate (PMMA), Mw=95,000
PM4: "DELPET 980N (Asahi Kasei (Corp.))", homocopolymer of methyl methacrylate (MMA), styrene (St), and maleic anhydride (MAH) (mass ratio=MMA:St: MAH=67:14:19), Mw=110,000
(Preparation of Other Compounds)
PL1: "Daifatty 101 (Daihachi Chemical Industry (Co., Ltd.))", adipic acid ester-containing compound, molecular weight: 326 to 378

Examples 1 to 49, Comparative Examples 1 to 9

(Kneading and Injection Molding)
Resin compositions (pellets) were obtained by implementing kneading using a two-axis kneading device (LTE20-44 manufactured by labtech engineering Co. Ltd.) at the prepared composition ratios shown in Table 1 to Table 3 and the kneading temperatures (cylinder temperatures) shown in Table 4 to Table 6.

Using the obtained pellets, an injection molding device (NEX500I manufactured by Nissei Plastic Industrial Co., Ltd.) was used to mold the resin-molded bodies of each of the following (1) and (2), whereby injection peak pressure did not exceed 180 MPa, and at the molding temperatures (cylinder temperature) and mold temperatures shown in Table 4 to Table 6.

(1): D12 test pieces (dimensions: 60 mm×60 mm×thickness 1 mm)
(2): ISO multipurpose dumbbell test pieces (measured portions: width 10 mm×thickness 4 mm).

<Evaluation>

The following evaluations were implemented on the obtained resin bodies and pellets. The evaluation results are shown in Table 4 to Table 6.

(Haze Value)
The obtained D12 test pieces were measured for haze value using a haze meter (NDH200 manufactured by Nippon Denshoku Industries).

(Tensile Modulus of Elasticity)
The obtained ISO multipurpose dumbbell test pieces were used to measure tensile elongation at break by the method according to ISO 527 (2012) using a universal testing device (Autograph AG-Xplus manufactured by Shimadzu (Corp.)).

(Charpy Impact Strength)
The obtained ISO multipurpose dumbbells were used, single-notched test pieces were processed into notched impact test pieces using a notching tool (A4E manufactured by Toyo Seiki Seisaku-sho, Ltd.) by the method according to ISO 179-1 (2010) so that the remaining width of notched test pieces with a single notch, notch type A, became 8 mm, the test pieces were installed so as to incur edgewise impact using an impact strength measuring device (Charpy Auto-Impact Tester CHN3 manufactured by Toyo Seiki Seisaku-sho, Ltd.), and notched impact strength (weld line impact strength) at 23° C. was measured.

(Water Absorbency)
The molded D12 test pieces were immersed in water by the method according to ISO 62 (1999) method 1, left at room temperature (25° C.) for 24 hours, then taken out and weighed to calculate water absorbency.

TABLE 1

| | | Composition | | | | | | | | | |
|---|---|---|---|---|---|---|---|---|---|---|---|
| | | Composition (A) | | Composition | | Composition | | Composition | | Composition | |
| | | Type | Amount (Parts) | Type | Amount (Parts) | Type | Amount (Parts) | Type | Amount (Parts) | Type | Amount (Parts) |
| Examples | 1 | CA1 | 100 | PE1 | 10 | CN1 | 10 | | | | |
| | 2 | CA1 | 100 | PE1 | 10 | CN1 | 10 | AE1 | 10 | | |
| | 3 | CA1 | 100 | PE1 | 10 | CN1 | 10 | AE2 | 10 | | |
| | 4 | CA1 | 100 | PE1 | 10 | CN1 | 10 | AE3 | 10 | | |
| | 5 | CA1 | 100 | PE1 | 10 | CN1 | 10 | AE4 | 10 | | |
| | 6 | CA1 | 100 | PE1 | 5 | CN1 | 10 | | | PM1 | 5 |
| | 7 | CA1 | 100 | PE1 | 5 | CN1 | 10 | AE1 | 10 | PM1 | 5 |
| | 8 | CA1 | 100 | PE1 | 5 | CN1 | 10 | AE1 | 10 | PM2 | 5 |
| | 9 | CA1 | 100 | PE1 | 5 | CN1 | 10 | AE1 | 10 | PM3 | 5 |
| | 10 | CA1 | 100 | PE1 | 5 | CN1 | 10 | AE1 | 10 | PM4 | 5 |
| | 11 | CA2 | 100 | PE1 | 10 | CN1 | 10 | AE1 | 10 | | |
| | 12 | CA3 | 100 | PE1 | 10 | CN1 | 10 | AE1 | 10 | | |
| | 13 | CA4 | 100 | PE1 | 10 | CN1 | 10 | AE1 | 10 | | |
| | 14 | CA5 | 100 | PE1 | 10 | CN1 | 10 | AE1 | 10 | | |
| | 15 | CA6 | 100 | PE1 | 10 | CN1 | 10 | AE1 | 10 | | |
| | 16 | CA7 | 100 | PE1 | 10 | CN1 | 10 | AE1 | 10 | | |
| | 17 | CA8 | 100 | PE1 | 10 | CN1 | 10 | AE1 | 10 | | |
| | 18 | CA1 | 100 | PE2 | 10 | CN1 | 10 | AE1 | 10 | | |
| | 19 | CA1 | 100 | PE3 | 10 | CN1 | 10 | AE1 | 10 | | |
| | 20 | CA1 | 100 | PE4 | 10 | CN1 | 10 | AE1 | 10 | | |
| | 21 | CA1 | 100 | PE5 | 10 | CN1 | 10 | AE1 | 10 | | |

TABLE 1-continued

|  |  | Composition Other | | Composition Ratio | | | | | |
|---|---|---|---|---|---|---|---|---|---|
|  |  | Type | Amount (Parts) | (B/A) | (C/A) | (C/B) | (C/(A + B + C) | (D/A) | (E/A) |
| Examples | 1 |  |  | 0.1 | 0.1 | 1.0 | 0.083 | — | — |
|  | 2 |  |  | 0.1 | 0.1 | 1.0 | 0.083 | 0.1 | — |
|  | 3 |  |  | 0.1 | 0.1 | 1.0 | 0.083 | 0.1 | — |
|  | 4 |  |  | 0.1 | 0.1 | 1.0 | 0.083 | 0.1 | — |
|  | 5 |  |  | 0.1 | 0.1 | 1.0 | 0.083 | 0.1 | — |
|  | 6 |  |  | 0.05 | 0.1 | 0.2 | 0.087 | — | 0.05 |
|  | 7 |  |  | 0.05 | 0.1 | 0.2 | 0.087 | 0.1 | 0.05 |
|  | 8 |  |  | 0.05 | 0.1 | 0.2 | 0.087 | 0.1 | 0.05 |
|  | 9 |  |  | 0.05 | 0.1 | 0.2 | 0.087 | 0.1 | 0.05 |
|  | 10 |  |  | 0.05 | 0.1 | 0.2 | 0.087 | 0.1 | 0.05 |
|  | 11 |  |  | 0.1 | 0.1 | 1.0 | 0.083 | 0.1 | — |
|  | 12 |  |  | 0.1 | 0.1 | 1.0 | 0.083 | 0.1 | — |
|  | 13 |  |  | 0.1 | 0.1 | 1.0 | 0.083 | 0.1 | — |
|  | 14 |  |  | 0.1 | 0.1 | 1.0 | 0.083 | 0.1 | — |
|  | 15 |  |  | 0.1 | 0.1 | 1.0 | 0.083 | 0.1 | — |
|  | 16 |  |  | 0.1 | 0.1 | 1.0 | 0.083 | 0.1 | — |
|  | 17 |  |  | 0.1 | 0.1 | 1.0 | 0.083 | 0.1 | — |
|  | 18 |  |  | 0.1 | 0.1 | 1.0 | 0.083 | 0.1 | — |
|  | 19 |  |  | 0.1 | 0.1 | 1.0 | 0.083 | 0.1 | — |
|  | 20 |  |  | 0.1 | 0.1 | 1.0 | 0.083 | 0.1 | — |
|  | 21 |  |  | 0.1 | 0.1 | 1.0 | 0.083 | 0.1 | — |

TABLE 2

|  |  | Composition | | | | | | | | |
|---|---|---|---|---|---|---|---|---|---|---|
|  |  | Composition (A) | | Composition (B) | | Composition (C) | | Composition (D) | | Composition (E) | |
|  |  | Type | Amount (Parts) | Type | Amount (Parts) | Type | Amount (Parts) | Type | Amount (Parts) | Type | Amount (Parts) |
| Examples | 22 | CA1 | 100 | PE6 | 10 | CN1 | 10 | AE1 | 10 |  |  |
|  | 23 | CA1 | 100 | PE1 | 10 | CN2 | 10 | AE1 | 10 |  |  |
|  | 24 | CA1 | 100 | PE1 | 10 | CN3 | 10 | AE1 | 10 |  |  |
|  | 25 | CA1 | 100 | PE1 | 10 | CN4 | 10 | AE1 | 10 |  |  |
|  | 26 | CA1 | 100 | PE1 | 10 | CN1 | 10 |  |  |  |  |
|  | 27 | CA1 | 100 | PE1 | 5 | CN1 | 10 |  |  |  |  |
|  | 28 | CA1 | 100 | PE1 | 50 | CN1 | 10 | AE1 | 10 |  |  |
|  | 29 | CA1 | 100 | PE1 | 5 | CN1 | 10 | AE1 | 10 |  |  |
|  | 30 | CA1 | 100 | PE1 | 50 | CN1 | 10 |  |  |  |  |
|  | 31 | CA1 | 100 | PE1 | 3 | CN1 | 10 |  |  |  |  |
|  | 32 | CA1 | 100 | PE1 | 55 | CN1 | 10 | AE1 | 10 |  |  |
|  | 33 | CA1 | 100 | PE1 | 3 | CN1 | 10 | AE1 | 10 |  |  |
|  | 34 | CA1 | 100 | PE1 | 55 | CN1 | 3 |  |  |  |  |
|  | 35 | CA1 | 100 | PE1 | 10 | CN1 | 30 |  |  |  |  |
|  | 36 | CA1 | 100 | PE1 | 10 | CN1 | 3 | AE1 | 10 |  |  |
|  | 37 | CA1 | 100 | PE1 | 10 | CN1 | 30 | AE1 | 10 |  |  |
|  | 38 | CA1 | 100 | PE1 | 10 | CN1 | 2 |  |  |  |  |
|  | 39 | CA1 | 100 | PE1 | 10 | CN1 | 35 |  |  |  |  |
|  | 40 | CA1 | 100 | PE1 | 10 | CN1 | 2 | AE1 | 10 |  |  |
|  | 41 | CA1 | 100 | PE1 | 10 | CN1 | 35 | AE1 | 10 |  |  |
|  | 42 | CA1 | 100 | PE1 | 10 | CN1 | 5 | AE1 | 10 |  |  |
|  | 43 | CA1 | 100 | PE1 | 10 | CN1 | 1.2 |  |  |  |  |
|  | 44 | CA1 | 100 | PE1 | 10 | CN1 | 1.8 |  |  |  |  |
|  | 45 | CA1 | 100 | PE1 | 5 | CN1 | 20 |  |  |  |  |
|  | 46 | CA1 | 100 | PE1 | 5 | CN1 | 17.5 |  |  |  |  |
|  | 47 | CA1 | 100 | PE1 | 8.5 | CN1 | 1.3 |  |  |  |  |
|  | 48 | CA1 | 100 | PE1 | 8.5 | CN1 | 1.8 |  |  |  |  |
|  | 49 | CA1 | 100 | PE1 | 10 | CN1 | 37 |  |  |  |  |

|  |  | Composition Other | | Composition Ratio | | | | | |
|---|---|---|---|---|---|---|---|---|---|
|  |  | Type | Amount (Parts) | (B/A) | (C/A) | (C/B) | (C/(A + B + C) | (D/A) | (E/A) |
| Examples | 22 |  |  | 0.1 | 0.1 | 1.0 | 0.083 | 0.1 | — |
|  | 23 |  |  | 0.1 | 0.1 | 1.0 | 0.083 | 0.1 | — |
|  | 24 |  |  | 0.1 | 0.1 | 1.0 | 0.083 | 0.1 | — |
|  | 25 |  |  | 0.1 | 0.1 | 1.0 | 0.083 | 0.1 | — |
|  | 26 |  |  | 0.05 | 0.1 | 2.0 | 0.087 | — | — |

TABLE 2-continued

| # | Type | Amount | | | | | | |
|---|---|---|---|---|---|---|---|---|
| 27 | | | 0.5 | 0.1 | 0.2 | 0.063 | — | — |
| 28 | | | 0.05 | 0.1 | 2.0 | 0.087 | 0.1 | — |
| 29 | | | 0.5 | 0.1 | 0.2 | 0.063 | 0.1 | — |
| 30 | | | 0.03 | 0.1 | 3.3 | 0.088 | — | — |
| 31 | | | 0.55 | 0.1 | 0.2 | 0.061 | — | — |
| 32 | | | 0.03 | 0.1 | 3.3 | 0.088 | 0.1 | — |
| 33 | | | 0.55 | 0.1 | 0.2 | 0.061 | 0.1 | — |
| 34 | | | 0.1 | 0.03 | 0.3 | 0.027 | — | — |
| 35 | | | 0.1 | 0.3 | 3.0 | 0.214 | — | — |
| 36 | | | 0.1 | 0.03 | 0.3 | 0.027 | 0.1 | — |
| 37 | | | 0.1 | 0.3 | 3.0 | 0.214 | 0.1 | — |
| 38 | | | 0.1 | 0.02 | 0.2 | 0.018 | — | — |
| 39 | | | 0.1 | 0.35 | 3.5 | 0.241 | — | — |
| 40 | | | 0.1 | 0.02 | 0.2 | 0.018 | 0.1 | — |
| 41 | | | 0.1 | 0.35 | 3.5 | 0.241 | 0.1 | — |
| 42 | PL1 | 5 | 0.1 | 0.05 | 0.5 | 0.043 | 0.1 | — |
| 43 | | | 0.1 | 0.012 | 0.12 | 0.011 | — | — |
| 44 | | | 0.1 | 0.018 | 0.18 | 0.0161 | — | — |
| 45 | | | 0.05 | 0.2 | 4 | 0.16 | — | — |
| 46 | | | 0.05 | 0.175 | 3.5 | 0.142857 | — | — |
| 47 | | | 0.085 | 0.013 | 0.153 | 0.01184 | — | — |
| 48 | | | 0.085 | 0.018 | 0.212 | 0.016319 | — | — |
| 49 | | | 0.1 | 0.37 | 3.7 | 0.251701 | — | — |

TABLE 3

| | | Composition | | | | | | | | |
|---|---|---|---|---|---|---|---|---|---|---|
| | | Composition (A) | | Composition (B) | | Composition (C) | | Composition (D) | | Composition (E) | |
| | | Type | Amount (Parts) | Type | Amount (Parts) | Type | Amount (Parts) | Type | Amount (Parts) | Type | Amount (Parts) |
| Comparative Examples | 1 | CA1 | 100 | | | | | | | | |
| | 2 | CA1 | 100 | PE1 | 10 | | | | | | |
| | 3 | CA1 | 100 | | | CN1 | 10 | | | | |
| | 4 | CA1 | 100 | PE4 | 10 | | | | | | |
| | 5 | CA1 | 100 | | | | | AE1 | 10 | | |
| | 6 | CA1 | 100 | PE1 | 10 | | | AE1 | 10 | | |
| | 7 | CA1 | 100 | | | CN1 | 10 | AE1 | 10 | | |
| | 8 | CA1 | 100 | PE1 | 10 | CN1 | 10 | | | | |
| | 9 | CA1 | 100 | PE1 | 10 | CN1 | 10 | AE1 | 10 | | |

| | | Composition Other | | Composition Ratio | | | | | |
|---|---|---|---|---|---|---|---|---|---|
| | | Type | Amount (Parts) | (B/A) | (C/A) | (C/B) | (C/(A + B + C) | (D/A) | (E/A) |
| Comparative Examples | 1 | | | — | — | — | — | — | — |
| | 2 | | | 0.1 | — | — | — | — | — |
| | 3 | | | — | 0.1 | — | 0.091 | — | — |
| | 4 | PL1 | 15 | 0.1 | — | — | — | — | — |
| | 5 | | | — | — | — | — | 0.1 | — |
| | 6 | | | 0.1 | — | — | — | 0.1 | — |
| | 7 | | | — | 0.1 | — | 0.091 | 0.1 | — |
| | 8 | | | 0.1 | 0.1 | 1.0 | 0.083 | — | — |
| | 9 | | | 0.1 | 0.1 | 1.0 | 0.083 | 0.1 | — |

TABLE 4

| | | Process Temperature | | | Evaluation | | | |
|---|---|---|---|---|---|---|---|---|
| | | Kneading Temp. (° C.) | Molding Temp. (° C.) | Mold Temp. (° C.) | Haze (%) | Tensile Modulus of Elasticity (Mpa) | Impact Strength (kJ/m$^2$) | Water Absorbency (% by mass) |
| Examples | 1 | 210 | 210 | 50 | 6.8 | 2150 | 11.2 | 1.7 |
| | 2 | 210 | 210 | 50 | 8.9 | 2040 | 16.6 | 1.5 |
| | 3 | 210 | 210 | 50 | 9.5 | 2020 | 16.4 | 1.5 |
| | 4 | 210 | 210 | 50 | 9.2 | 2040 | 16.4 | 1.5 |

TABLE 4-continued

|  | | Process Temperature | | Evaluation | | |
|---|---|---|---|---|---|---|
|  | | | | | Tensile | |
|  | Kneading Temp. (° C.) | Molding Temp. (° C.) | Mold Temp. (° C.) | Haze (%) | Modulus of Elasticity (Mpa) | Impact Strength (kJ/m²) | Water Absorbency (% by mass) |
| 5 | 210 | 210 | 50 | 9.2 | 2030 | 15.9 | 1.5 |
| 6 | 210 | 210 | 50 | 6.7 | 2110 | 10.9 | 1.7 |
| 7 | 210 | 210 | 50 | 8.8 | 2120 | 16.1 | 1.5 |
| 8 | 210 | 210 | 50 | 8.9 | 2100 | 16.2 | 1.5 |
| 9 | 210 | 210 | 50 | 9 | 2100 | 16.7 | 1.5 |
| 10 | 210 | 210 | 50 | 9.9 | 2130 | 15.7 | 1.4 |
| 11 | 210 | 210 | 50 | 8.4 | 2040 | 16.1 | 1.5 |
| 12 | 210 | 210 | 50 | 8.7 | 2070 | 15.5 | 1.6 |
| 13 | 210 | 210 | 50 | 8.8 | 2410 | 13 | 2.2 |
| 14 | 210 | 210 | 50 | 9 | 2010 | 16.2 | 1.6 |
| 15 | 210 | 210 | 50 | 8.7 | 1840 | 17.1 | 1.4 |
| 16 | 230 | 230 | 50 | 16.6 | 2700 | 8 | 3.4 |
| 17 | 260 | 260 | 50 | 16.9 | 2730 | 7.2 | 2.8 |
| 18 | 210 | 210 | 50 | 8.5 | 2040 | 16.5 | 1.5 |
| 19 | 210 | 210 | 50 | 8.6 | 2040 | 16 | 1.5 |
| 20 | 210 | 210 | 50 | 8.9 | 1780 | 17.4 | 1.5 |
| 21 | 210 | 210 | 50 | 8.5 | 1760 | 17.1 | 1.5 |

TABLE 5

|  |  | Process Temperature | | | Evaluation | | |
|---|---|---|---|---|---|---|---|
|  |  | | | | | Tensile | Water |
|  |  | Kneading Temp. (° C.) | Molding Temp. (° C.) | Mold Temp. (° C.) | Haze (%) | Modulus of Elasticity (Mpa) | Impact Strength (kJ/m²) | Absorbency (% by mass) |
| Comparative Examples | 22 | 210 | 210 | 50 | 17.2 | 1780 | 7.6 | 1.5 |
|  | 23 | 210 | 210 | 50 | 9.1 | 2060 | 16 | 1.5 |
|  | 24 | 210 | 210 | 50 | 9.2 | 2030 | 14.9 | 1.5 |
|  | 25 | 210 | 210 | 50 | 14.1 | 2090 | 15.5 | 1.6 |
|  | 26 | 210 | 210 | 50 | 6.4 | 1690 | 10.4 | 1.7 |
|  | 27 | 210 | 210 | 50 | 12.1 | 2440 | 8.9 | 1.5 |
|  | 28 | 210 | 210 | 50 | 9.3 | 1590 | 16.9 | 1.7 |
|  | 29 | 210 | 210 | 50 | 12.3 | 2320 | 11.5 | 1.4 |
|  | 30 | 210 | 210 | 50 | 5.7 | 1540 | 10.4 | 1.8 |
|  | 31 | 210 | 210 | 50 | 12.4 | 2470 | 6.1 | 1.4 |
|  | 32 | 210 | 210 | 50 | 8.8 | 1490 | 17.2 | 1.8 |
|  | 33 | 210 | 510 | 50 | 12.4 | 2340 | 10.5 | 1.4 |
|  | 34 | 210 | 210 | 50 | 11.7 | 2290 | 6.1 | 2.2 |
|  | 35 | 210 | 210 | 50 | 12.5 | 1700 | 16 | 1.2 |
|  | 36 | 210 | 210 | 50 | 12.3 | 1870 | 11.6 | 2.2 |
|  | 37 | 210 | 210 | 50 | 12.9 | 1650 | 18.1 | 1.2 |
|  | 38 | 210 | 210 | 50 | 14.9 | 2290 | 6.1 | 2.3 |
|  | 39 | 210 | 210 | 50 | 17.9 | 1670 | 16.2 | 1.2 |
|  | 40 | 210 | 210 | 50 | 15.2 | 1880 | 11.8 | 2.3 |
|  | 41 | 210 | 210 | 50 | 19.1 | 1620 | 17.7 | 1.2 |
|  | 42 | 210 | 210 | 50 | 9.3 | 2000 | 16.9 | 2 |
|  | 43 | 230 | 230 | 50 | 17 | 2300 | 4.7 | 2.3 |
|  | 44 | 230 | 230 | 50 | 15.6 | 2290 | 5.8 | 2.3 |
|  | 45 | 210 | 210 | 50 | 16.5 | 1640 | 16.8 | 1.4 |
|  | 46 | 210 | 210 | 50 | 13.2 | 1680 | 16.5 | 1.5 |
|  | 47 | 230 | 230 | 50 | 16.8 | 2250 | 6.5 | 2.3 |
|  | 48 | 230 | 230 | 50 | 15.3 | 2220 | 7.7 | 2.2 |
|  | 49 | 210 | 210 | 50 | 18.5 | 1620 | 16.3 | 1.2 |

TABLE 6

|  | | Process Temperature | | | Evaluation | | |
|---|---|---|---|---|---|---|---|
|  | | Kneading Temp. | Molding Temp. (° C.) | Mold Temp. (° C.) | Haze (%) | Tensile Modulus of Elasticity (Mpa) | Impact Strength (kJ/m$^2$) | Water Absorbency (% by mass) |
| Comparative Example | 1 | 240 | 240 | 50 | 1.7 | 1980 | 5.9 | 2.5 |
|  | 2 | 230 | 230 | 50 | 22 | 2310 | 4.4 | 2.4 |
|  | 3 | 210 | 210 | 50 | 5.7 | 1510 | 10.5 | 1.8 |
|  | 4 | 190 | 190 | 50 | 25 | 1380 | 15.1 | 2.2 |
|  | 5 | 220 | 220 | 50 | 5.2 | 1730 | 11.1 | 2.3 |
|  | 6 | 220 | 220 | 50 | 24 | 1900 | 11.3 | 2.2 |
|  | 7 | 210 | 210 | 50 | 9.1 | 1420 | 17.2 | 1.8 |
|  | 8 | 210 | 210 | 50 | 24 | 2180 | 10.8 | 1.7 |
|  | 9 | 210 | 210 | 50 | 29 | 2020 | 16.4 | 1.6 |

From the results, it is clear that the resin compositions and the resin-molded bodies of the present examples have high transparency compared to the resin compositions and the resin-molded bodies of the comparative examples.

The present invention has been described with reference detailed and defined embodiments; however, various changes and modifications may be made without departing from the spirit and scope of the present invention.

The present application claims priority based on a Japanese Patent Application filed on Mar. 6, 2018 (JP 2018-039561).

The invention claimed is:

1. A resin composition, comprising:
   a cellulose acylate (A),
   a polyester resin (B),
   a cardanol composition (C) containing a cardanol-based compound having an epoxy group, and
   a polymer (D) of at least one type selected from a polymer with a core-shell structure having a core layer and a shell layer including a polymer of alkyl (meth)acrylate on the surface of the core layer, and an olefin polymer including 60% by mass or more of a structural unit derived from an α-olefin.

2. The resin composition according to claim 1, further comprising in a matrix a poly(meth)acrylate compound (E) including 50 parts by mass or more of a structural unit derived from an alkyl (meth)acrylate.

3. The resin composition according to claim 1, wherein the cellulose acylate (A) is at least one type selected from cellulose acetate propionate (CAP) and cellulose acetate butyrate (CAB).

4. The resin composition according to claim 1, wherein the polyester resin (B) is a polyhydroxyalkanoate.

5. The resin composition according to claim 4, wherein the polyester resin (B) is a polylactic acid.

6. The resin composition according to claim 1, wherein the cardanol composition (C) comprises a compound of at least one type selected from a compound represented by a general formula (CDN1), and a polymer in which the compound represented by the general formula (CDN1) is polymerized, wherein general formula (CND1) optionally comprises a group (EP) and wherein general formula (CND1) and group (EP) are as follows:

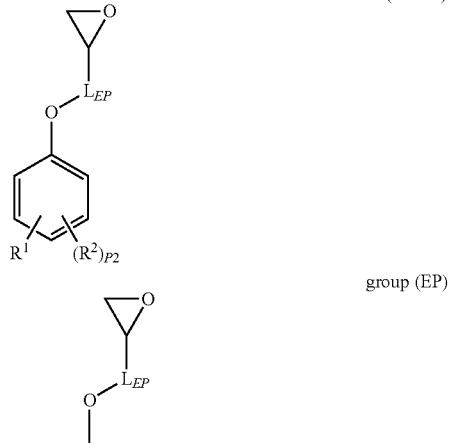

wherein, R$^1$ represents an alkyl group that may have a hydroxyl or an epoxy substituent group, or an unsaturated aliphatic group that has a double bond and may have a hydroxyl or an epoxy substituent group; —R$^2$ represents a group represented by the group (EP), a hydroxyl group, a carboxy group, an alkyl group that may have a hydroxyl or an epoxy substituent group, or an unsaturated aliphatic group that has a double bond and may have a hydroxyl or an epoxy substituent group; P2 represents an integer of 0 or more and 4 or less, with the proviso that each R$^2$, which is present in plurality when P2 is two or more, may be the same group, or may be a different group; and wherein, L$_{EP}$ represents a single bond or a divalent linking group, with the proviso that each L$_{EP}$, which is present in plurality in general formula (CDN1) when there is a group represented by the group (EP) as R$^2$, may be the same group, or may be a different group.

7. The resin composition according to claim 1, wherein the epoxy equivalent of the cardanol composition (C) is 500 or less.

8. The resin composition according to claim 1, wherein the mass ratio (B/A) of the polyester resin (B) to the cellulose acylate (A) is 0.05 or more and 0.5 or less.

9. The resin composition according to claim 1, wherein the mass ratio (C/A) of the cardanol composition (C) to the cellulose acylate (A) is 0.01 or more and 0.3 or less.

10. The resin composition according to claim 1, wherein the mass ratio (C/B) of the cardanol composition (C) to the polyester resin (B) is 0.15 or more and 3.75 or less.

11. The resin composition according to claim 9, wherein the mass ratio (C/(A+B+C)) of the cardanol composition (C) to the total of the cellulose acylate (A), the polyester resin (B), and the cardanol composition (C) is 0.015 or more and 0.245 or less.

12. A resin-molded body, comprising the resin composition according to claim 1.

13. The resin-molded body according to claim 12, wherein the resin-molded body is an injection-molded body.

14. The resin composition according to claim 10, wherein the mass ratio (C/(A+B+C)) of the cardanol composition (C) to the total of the cellulose acylate (A), the polyester resin (B), and the cardanol composition (C) is 0.015 or more and 0.245 or less.

15. A resin composition, comprising:
a cellulose acylate (A),
a polyester resin (B), and
a cardanol composition (C) containing a cardanol-based compound having an epoxy group, wherein the polyester resin (B) is a polylactic acid.

16. The resin composition according to claim 15, wherein the mass ratio (B/A) of the polyester resin (B) to the cellulose acylate (A) is 0.05 or more and 0.5 or less.

17. The resin composition according to claim 15, wherein the mass ratio (C/A) of the cardanol composition (C) to the cellulose acylate (A) is 0.01 or more and 0.3 or less.

18. The resin composition according to claim 15, wherein the mass ratio (C/B) of the cardanol composition (C) to the polyester resin (B) is 0.15 or more and 3.75 or less.

19. The resin composition according to claim 17, wherein the mass ratio (C/(A+B+C)) of the cardanol composition (C) to the total of the cellulose acylate (A), the polyester resin (B), and the cardanol composition (C) is 0.015 or more and 0.245 or less.

* * * * *